(12) United States Patent
Jaszkowiak et al.

(10) Patent No.: US 11,166,447 B2
(45) Date of Patent: Nov. 9, 2021

(54) UNIVERSAL CLAMP FOR SECURING AN OBJECT TO A FISHING LINE

(71) Applicants: Karsten Jaszkowiak, Berlin (DE); Martin Gottschling, Berlin (DE)

(72) Inventors: Karsten Jaszkowiak, Berlin (DE); Martin Gottschling, Berlin (DE)

(73) Assignee: Karsten Jaszkowiak, Berlin (DE)

( * ) Notice: Subject to any disclaimer, the term of this patent is extended or adjusted under 35 U.S.C. 154(b) by 165 days.

(21) Appl. No.: 16/340,522

(22) PCT Filed: Oct. 12, 2017

(86) PCT No.: PCT/DE2017/100869
§ 371 (c)(1),
(2) Date: Apr. 9, 2019

(87) PCT Pub. No.: WO2018/068793
PCT Pub. Date: Apr. 19, 2018

(65) Prior Publication Data
US 2020/0045947 A1    Feb. 13, 2020

(30) Foreign Application Priority Data

Oct. 12, 2016  (DE) .................. 10 2016 119 372.0
Oct. 12, 2016  (DE) .................. 10 2016 119 375.5

(51) Int. Cl.
*A01K 95/02*    (2006.01)
(52) U.S. Cl.
CPC .................... *A01K 95/02* (2013.01)
(58) Field of Classification Search
CPC ......... A01K 85/00; A01K 95/00; A01K 95/02

USPC .............. 43/42.06, 42.09, 43.1, 43.12, 43.14
See application file for complete search history.

(56) References Cited

U.S. PATENT DOCUMENTS

| | | | |
|---|---|---|---|
| 3,081,574 A * | 3/1963 | Wise ...................... | A01K 95/00 43/43.12 |
| 3,346,986 A | 10/1967 | Tiikkainen | |
| 3,982,350 A | 9/1976 | Heckathorn | |
| 5,531,042 A | 7/1996 | Rinker et al. | |
| 5,715,627 A * | 2/1998 | Jones ...................... | A01K 85/00 43/42 |
| 6,168,539 B1 * | 1/2001 | Maina .................. | A63B 43/007 473/424 |
| D678,110 S * | 3/2013 | Correa .................. | A01K 95/00 D11/79 |
| 2006/0070291 A1 | 4/2006 | Pomeroy | |
| 2011/0252690 A1 | 10/2011 | Pomeroy | |
| 2013/0247447 A1 | 9/2013 | Bono | |
| 2014/0190066 A1 * | 7/2014 | Bono ...................... | A01K 95/02 43/43.12 |
| 2016/0324135 A1 * | 11/2016 | Hall ........................ | A01K 97/00 |

FOREIGN PATENT DOCUMENTS

| | | |
|---|---|---|
| DE | 2857493 A1 | 9/1980 |
| DE | 202004006357 U1 | 8/2004 |
| WO | 2004071187 A1 | 8/2004 |

* cited by examiner

*Primary Examiner* — Brady W Frazier
(74) *Attorney, Agent, or Firm* — Smartpat PLC

(57) ABSTRACT

The invention relates to a universal clamp (eU, 6) for securing any objects (10) to a fishing line (12, 130), said clamp allowing, owing to an elastic element, any objects (10) to be secured to the fishing line (12, 130).

7 Claims, 25 Drawing Sheets

Illustration 17

Illustration 18

Illustration 19

Illustration 20

Illustration 21

Illustration 22

Illustration 23

Illustration 24

Illustration 25

Illustration 26

Illustration 27

Illustration 28

Illustration 29

Illustration 30

Illustration 31

Illustration 32

Illustration 33 pattern G-G

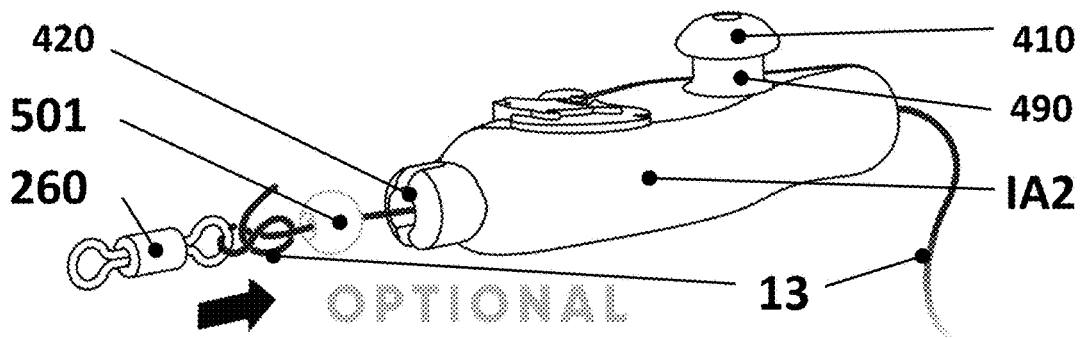
FIG. 11 a
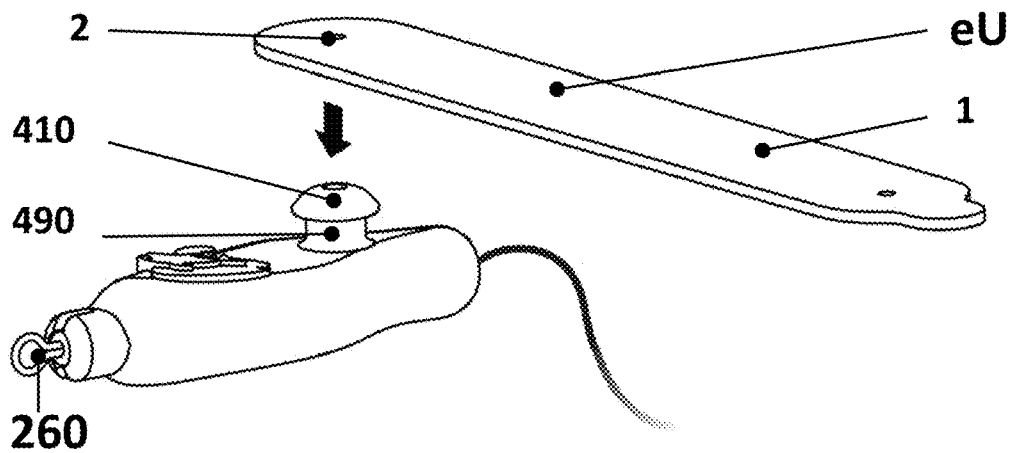
FIG. 11 b
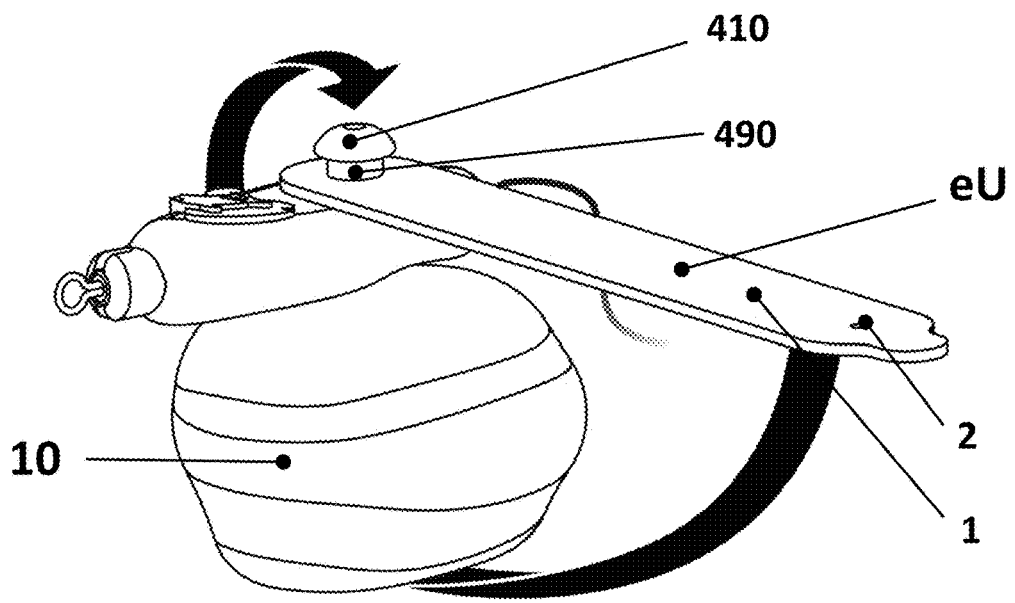
FIG. 11 c
FIG. 11

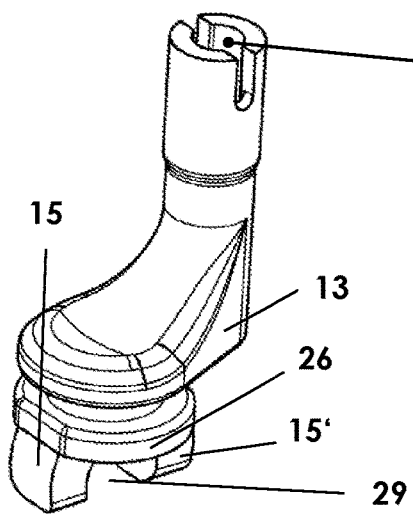
FIG. 16 a
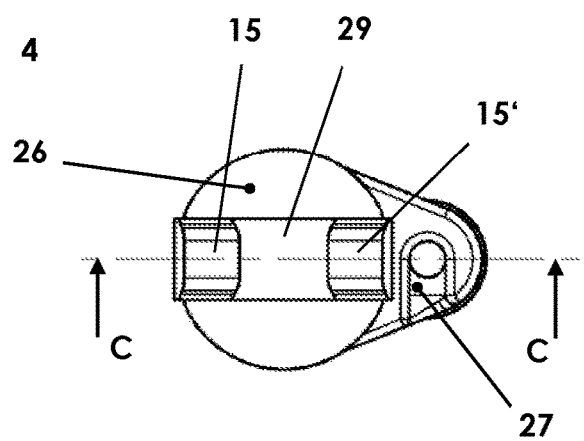
FIG. 16 b
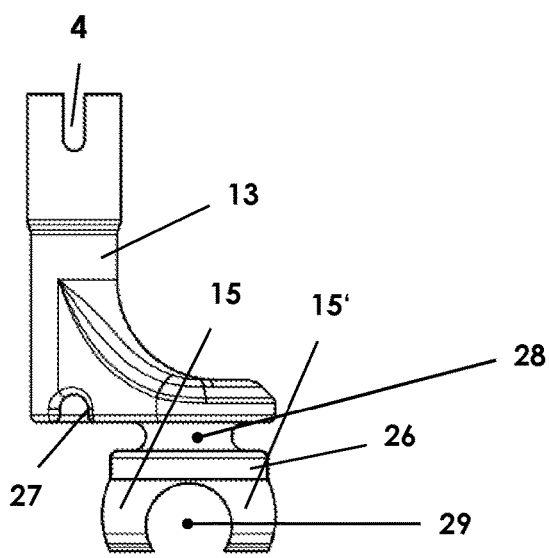
FIG. 16 c
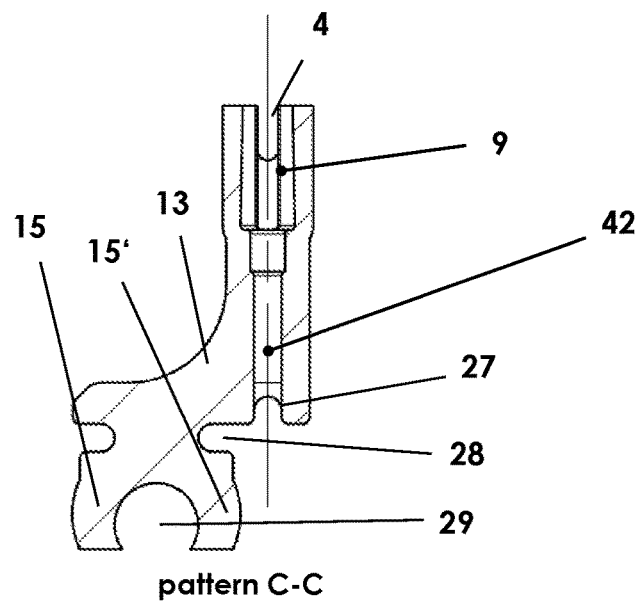
pattern C-C
FIG. 16 d
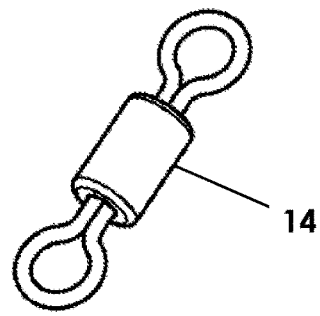
FIG. 16 e
FIG. 16

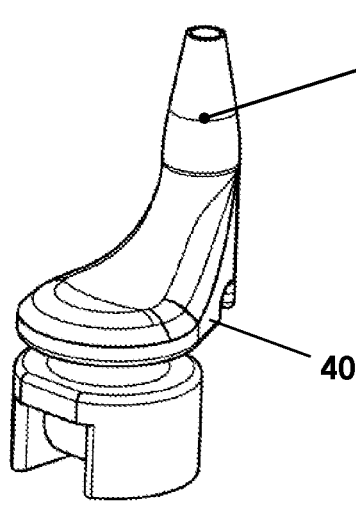
FIG. 17 a
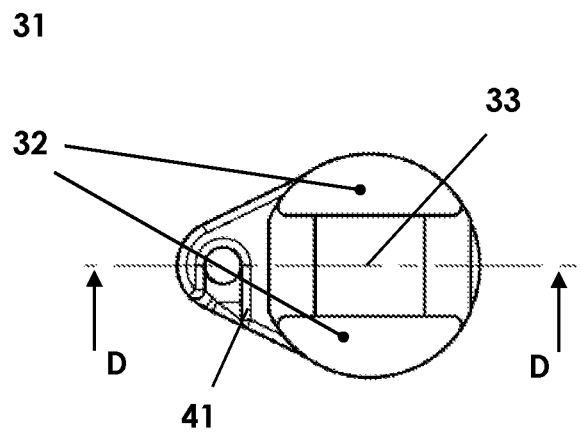
FIG. 17 b
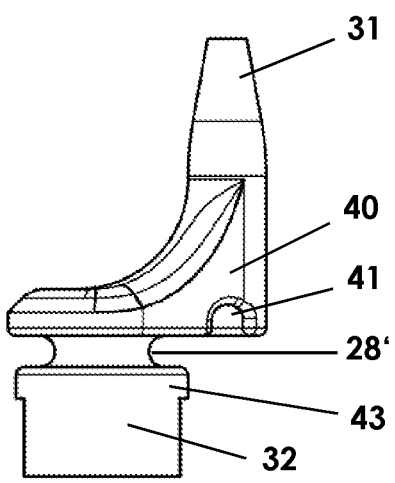
FIG. 17 c
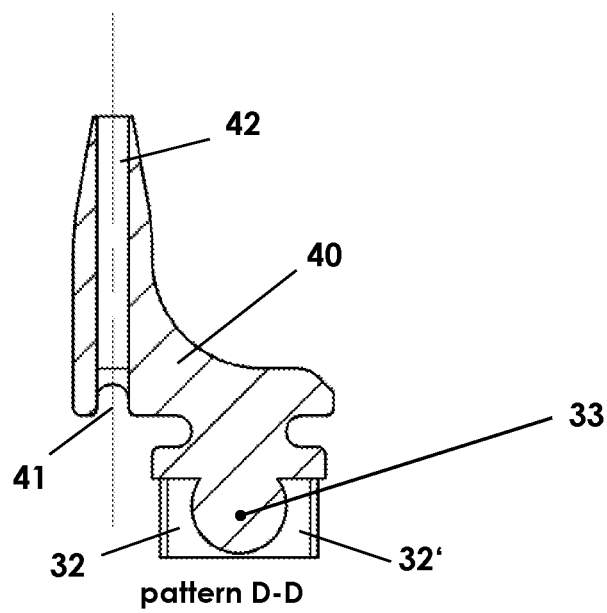
pattern D-D
FIG. 17 d
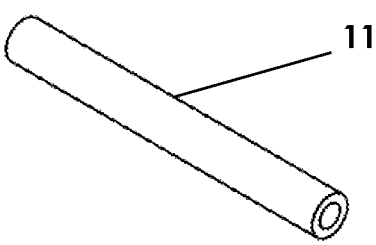
FIG. 17 e
FIG. 17

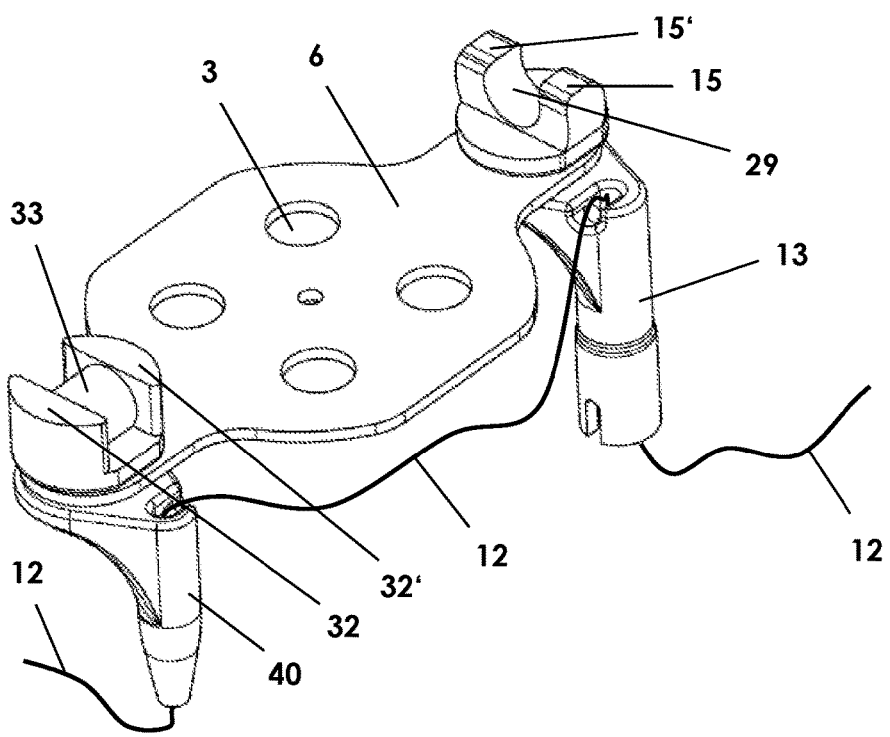
FIG. 18 a
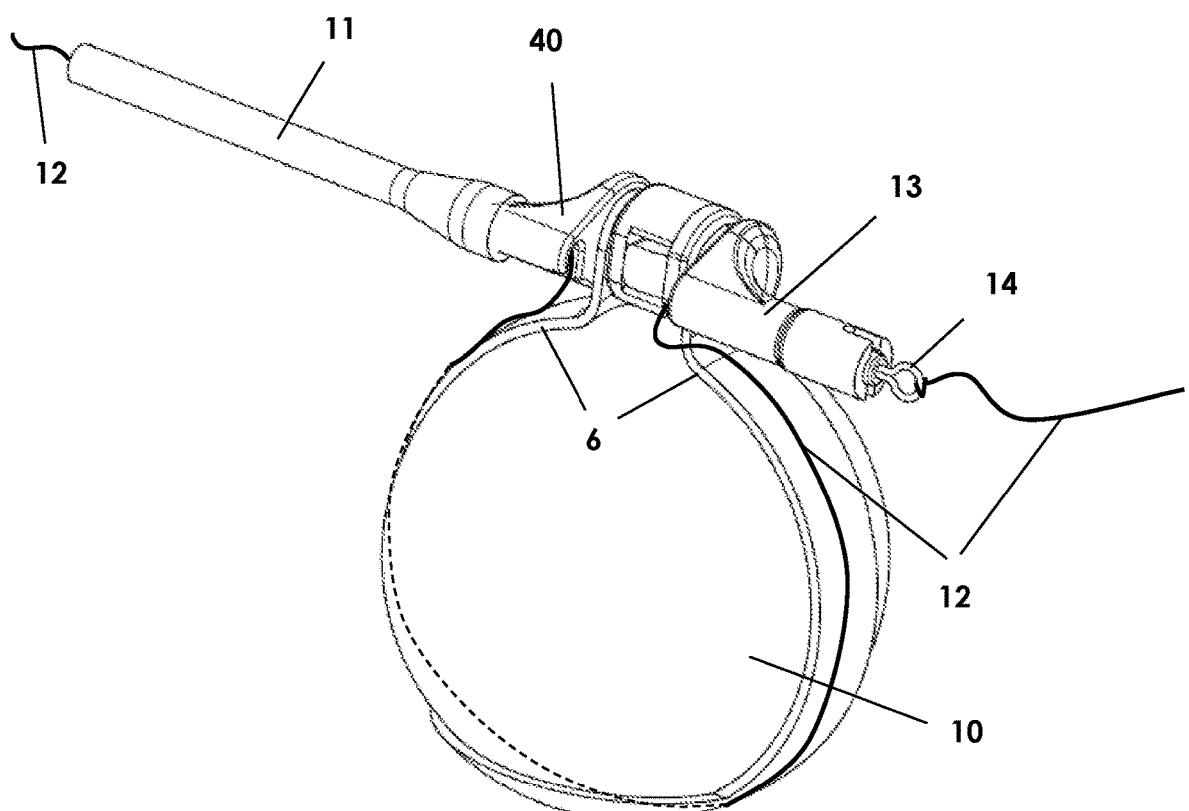
FIG. 18 b
FIG. 18

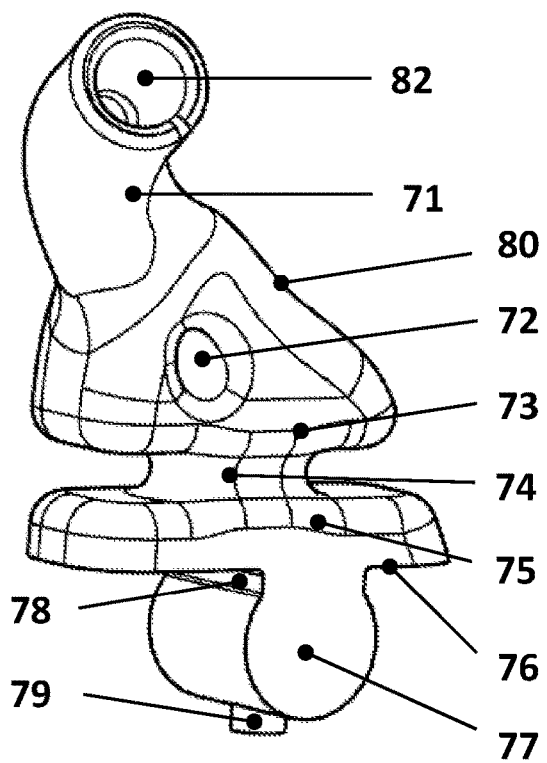
FIG. 20 a
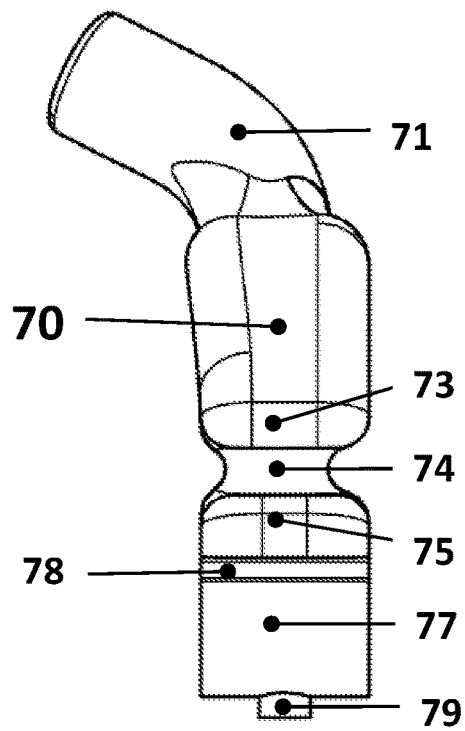
FIG. 20 b
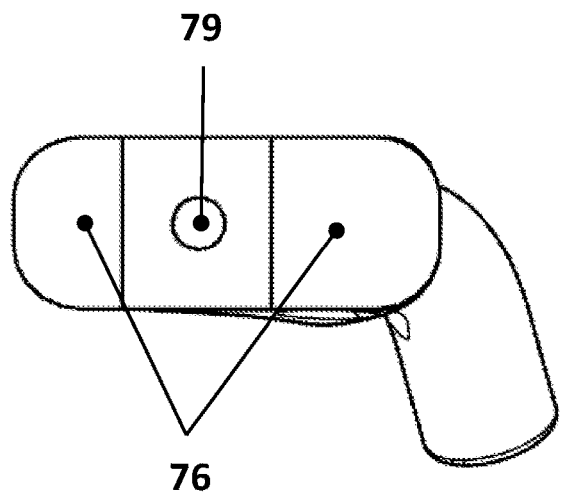
FIG. 20 c
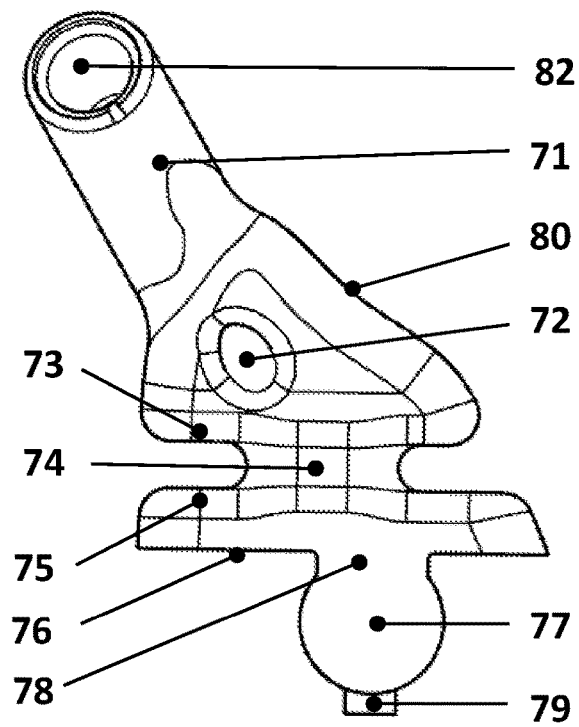
FIG. 20d
FIG. 20

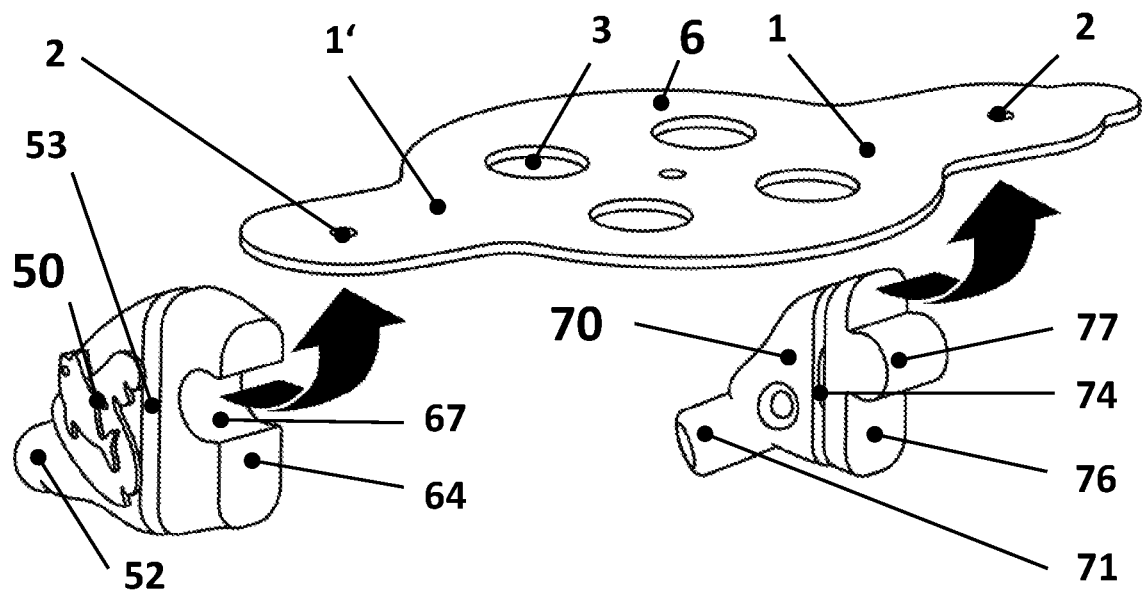
FIG. 21 a
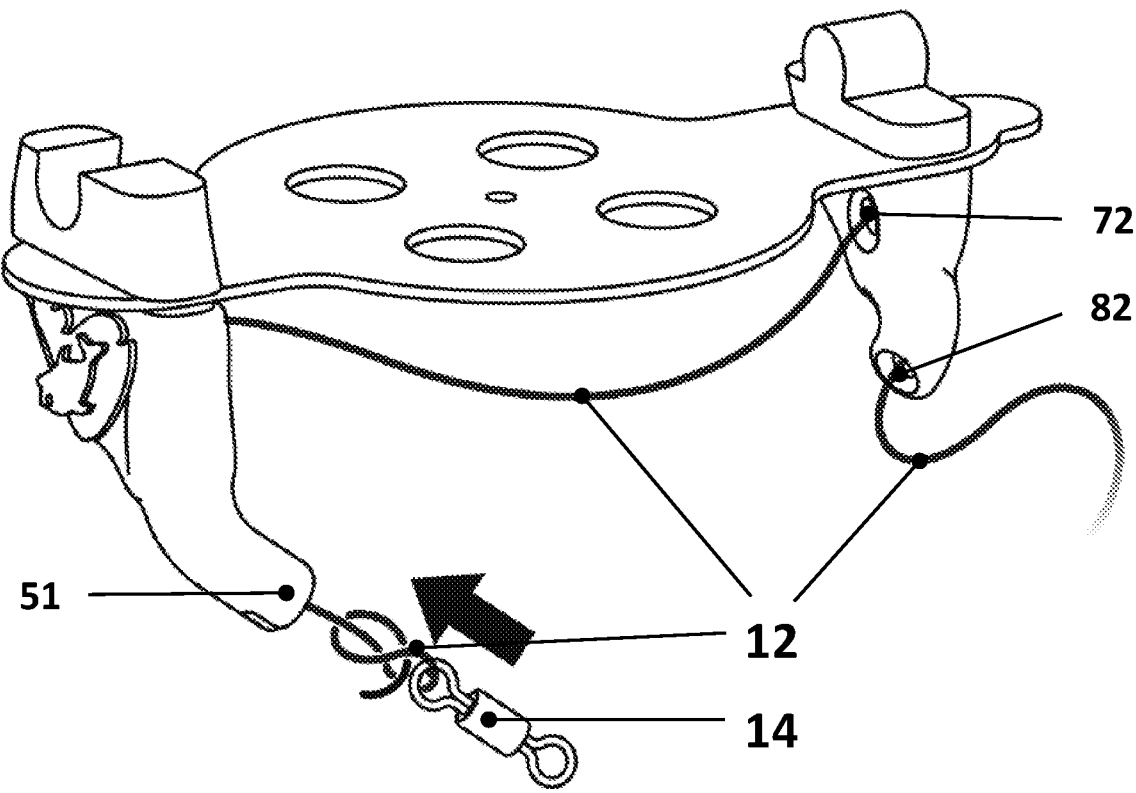
FIG. 21 b
FIG. 21

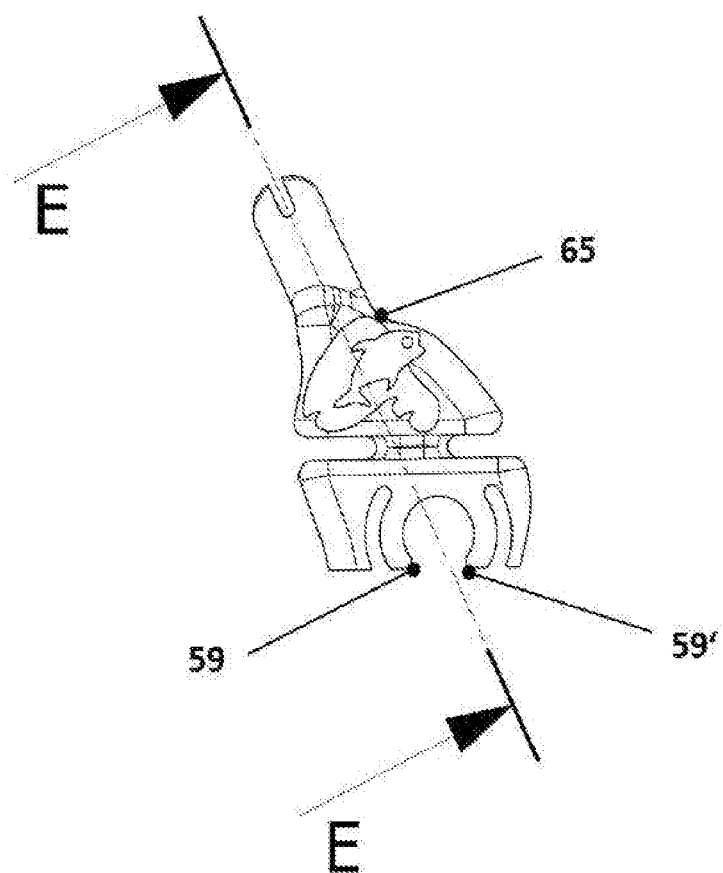
FIG. 23 e
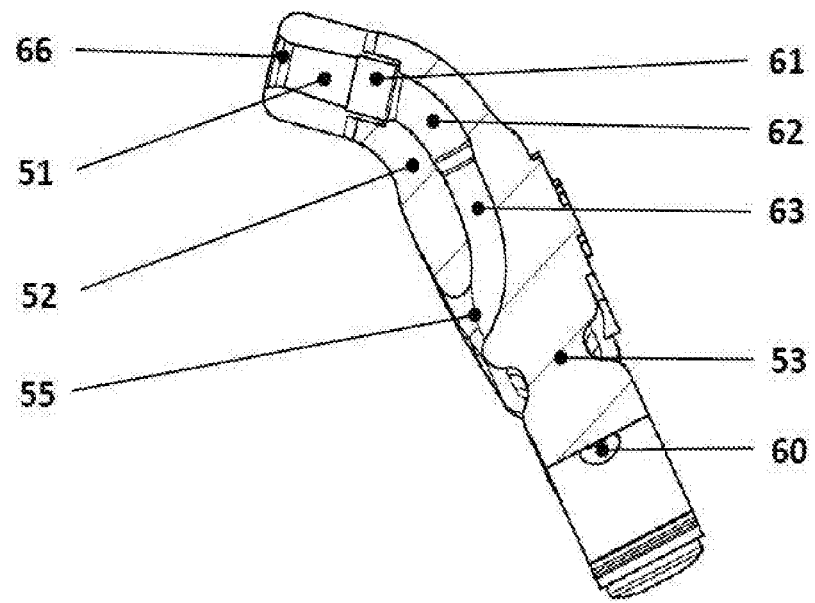
pattern E-E
FIG. 23 f
FIG. 23

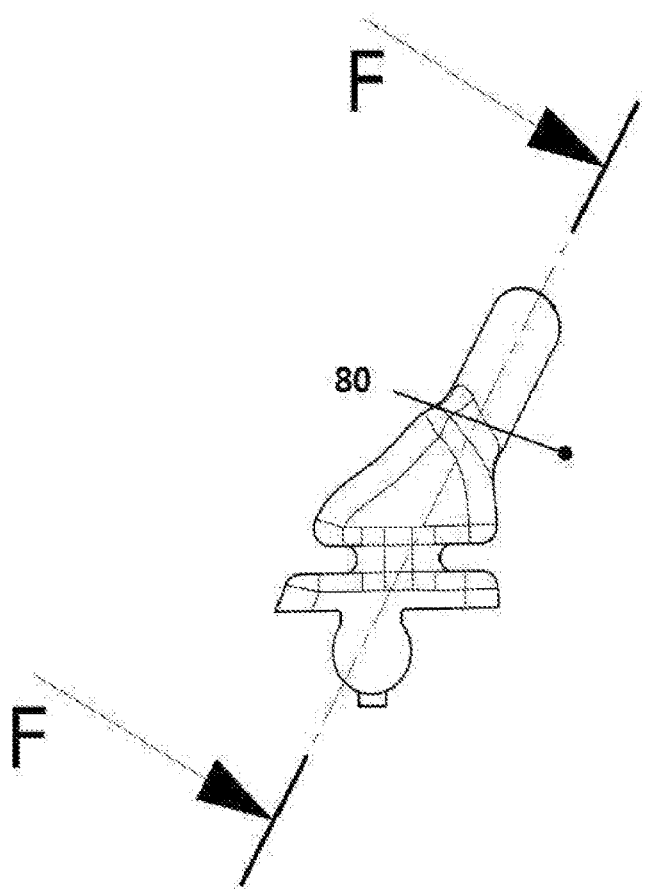
FIG. 24 e
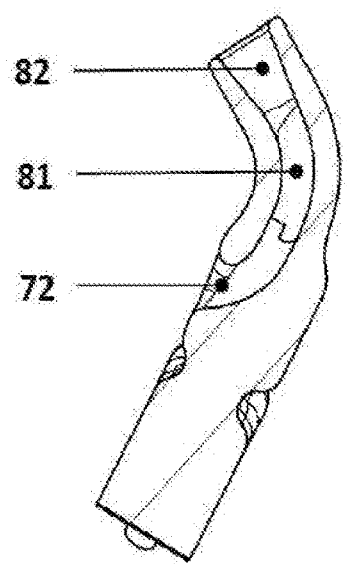
pattern F-F
FIG. 24 f
FIG. 24

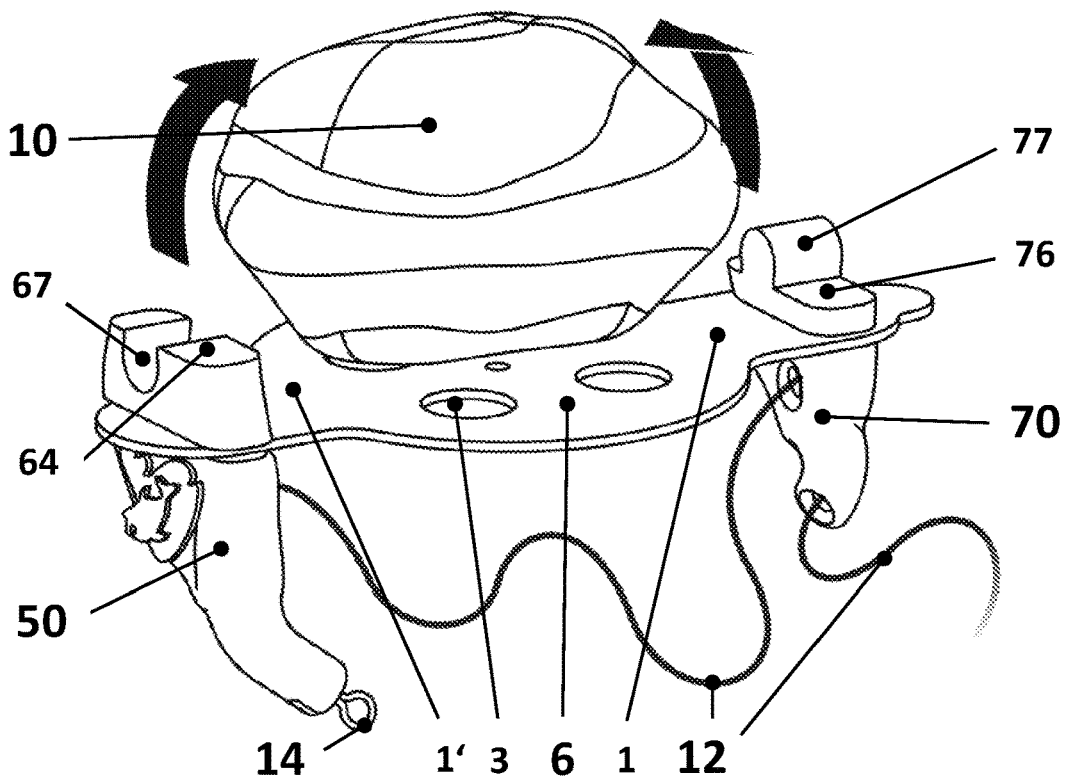
FIG. 25 c
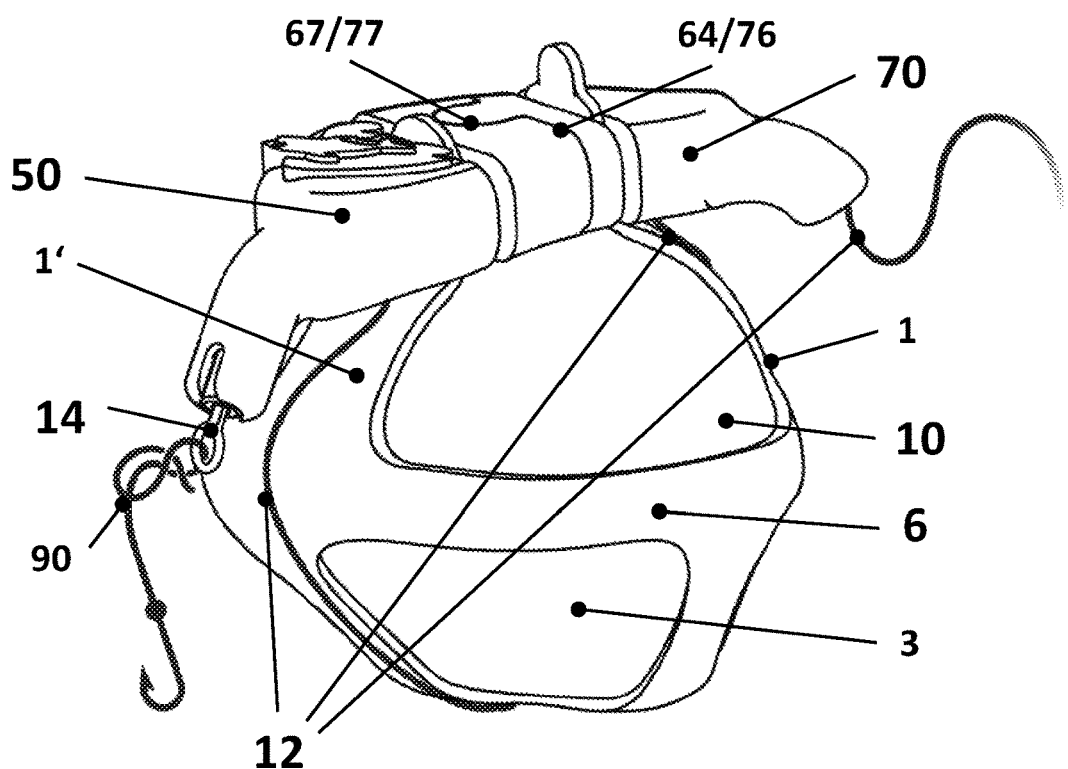
FIG. 25 d
FIG. 25

UNIVERSAL CLAMP FOR SECURING AN OBJECT TO A FISHING LINE

TECHNICAL FIELD

The invention relates to a universal clamp for fastening arbitrary objects to a fishing line which, due to an elastic device, enables any object to be fastened on the fishing line.

BACKGROUND

The solution of boring or bonding a fastening lug on stones according to WO 2004/071187 A1 and US 2011/0252690 A1 is described. In this case, a special stone is prepared for use as a weight, which resembles the usual lead fastening except for the material.

Likewise described in DE 20 2004 006 357 U1 is the utilization of alternative materials. The special design implementation and the principles of installation are based on usual lead weights.

Different solutions for the fastening of a weight are illustrated in US 2013/0247447 A1. The utilization of water-soluble belts is described here, which are wound one or more times around the weight. Further described are small bags that can be filled with any arbitrary number of weights.

Furthermore, results from research on the Internet indicate the possibility of fixing stones on the installation by winding or tying with simple fishing line. This indicates that leading companies from the fishing sector are also already paying attention to the subject, yet no practical, simple technical solution exists that is applicable for different fishing sectors.

SUMMARY

The invention has the objective of finding a universal clamp for the fastening of arbitrary objects to a fishing line, enabling the affixing of any arbitrary object, regardless of type or shape, to a fishing line.

It is the task of the invention to realize a universal clamp for the fastening of any arbitrary object to a fishing line, making it possible to attach arbitrary objects to the fishing line either fixed or detachable using the universal clamp.

The task is solved by a universal clamp for the fastening of arbitrary objects to a fishing line as claimed.

Here, a universal clamp for the fastening of arbitrary objects to a fishing line was developed so that, an elastic universal clamp indicates several fingers and a fastening option is provided at the end of a finger,
the elastic universal clamp consists of elastic material,
a fastening option is provided at the end of a finger of the elastic universal clamp, such as a hole, an opening in any form, a lug, a fixing hook, a magnet, detachable rivets, a loop or a slot, as a fixed or detachable connection.

With traditional fishing methods the lead remains in the water body after every tearing off. A large quantity of the toxic heavy metal therefore collects on the bottom of the fishing water bodies on a long-term basis. Lead is included among the Europe-wide group of 33 dangerous, high-priority materials. Lead is a bio-accumulator with a high level of persistence. Simply expressed, this means that the lead particles and oxides continuously concentrate in every form of living being, and they are not biologically degradable in the environment. The water and the microorganisms absorb the lead. As a basis of the food chain, the heavy metal is ingested into the bodies of the fish we eat. Via the water, the entire food chain circuit is ultimately contaminated. The absorbed lead is deposited in our body and poisons it permanently. In the long-term, lead therefore has a harmful effect on the water body, the domestic biosphere and ultimately on the entire food chain. The legislature has also become aware of the dangerous effects of lead. To date Denmark is the only country with a comprehensive prohibition on the import and sale of lead fishing weights. Further countries, such as Canada introduced prohibitions for special weight classes (for example lead weights below 50 g) (Thomas & Guitart 2010, pp. 62.; Environment Canada 2004). In Europe, draft bills for the integrated prohibition of lead fishing accessories are already being discussed, however, not yet evaluated with the necessary insight and accordingly rejected. According to the Surface Water Ordinance, it is already regulated that high-priority materials may not be introduced into German water bodies any longer after the year 2021. On consideration of the annual totaled amounts, it is only a question of time before legislation regulates the introduction of lead caused by anglers, and it is just for this case that practical alternatives exist. Denmark leads also in the documentation of lead introduction by anglers into water bodies. It supplies the only detailed study on this, specifying that before the lead prohibition, 97 to 170 tons of lead were introduced annually into water bodies by anglers (Lassen et al 2003). The numbers vary strongly between individual states. Therefore, research has resulted in an unconfirmed value of 660 tons per annum in Germany up to a minimum of 1000 tons in Poland. The total amount of lead that reaches European water bodies caused by anglers is between 2000 and 6000 tons (European Commission: Advantages and drawbacks of restricting the marketing and use of lead in ammunition, fishing sinkers and candle wicks, Final Report 2004, pp. 90-94). Particles are abraded continuously through friction of water, sand or living beings, entering into the water and the entire food chain in this way. While there are in part fishing sinkers with protective coatings, this does not apply to all products on the market and it is only a question of time until the protective coating wears off under environmental impact and open spots of lead are exposed. The quantities of the heavy metal introduced into the water cannot be dismissed as negligible, but rather should be dealt with responsibly. Discussions on the subject have also been ongoing for many years in fishing forums. Accordingly, an ecological, natural replacement is required. The already described invention supplies an integrated, flexible alternative solution for the utilization of fishing weights.

Bottom fishing, that is fishing with a fishing-rod on the bottom of a water body, requires a weight for lowering the fishing fittings and the bait. Weights of lead in different implementations and shapes have been used for this almost exclusively for a considerable time. A further possibility is the use of a feed basket. This is used in order to place feed in direct proximity of the hook by means of ejection. Such feed baskets are provided either as a very light version without additional weight or with a defined lead weight. In general, a basic installation with the selected weight is fixed linked with the main line. It thus involves a fixed collection of individual parts with a stipulated weight. For changing the lead weight, the entire installation is usually built up anew. Additional parts exist, such as spacers and carabiners, which enable a replacement of the weights. For this however, an existing product range of different lead weights is required. In difficult water bodies with many obstacles, the entire installation often tears off. As a result of this, large quantities of lead are left in water bodies on a long-term basis.

With carp fishing in particular, different bottom fishing systems exist on the market in order to cause a release of the lead after a bite of the fish. The discharge of the lead serves to facilitate the playing of fish and to increase the prospect of a successful landing. Contact with fish is transferred to the fishing-rod more directly by the free main line. This makes the movements of the fish better perceptible for the angler. Furthermore, the lead pulls the fish permanently to the bottom of the water body if it is attached fixed without a drop-off mechanism. Obstacles, such as branches, stone piles, sharp-edged mussel banks or aquatic plants, in which the lead or the fittings can be caught, are located there. The fish is mostly lost in this case. Often the loss of the entire fishing fittings also happens here. In addition, the fish can use the lead weight in order to shake itself free of the hook, where it also disappears. A fitting where the loss of the weight is included therefore significantly increases the chances of a successful play.

Furthermore, there is the possibility of angling with a buoyant object or a float. This floats on the water body surface, where the hook is attached at any arbitrary depth below the float. As a result of this fitting, it is possible for the angler to fish at different depths of the water body to target fish at mean water level or at the surface. Up to now bottom and float fishing involve almost exclusively two fundamentally different fittings that are not compatible with each other.

Several design examples for the application of the universal clamp are described with reference to the following illustrations.

BRIEF DESCRIPTION OF THE DRAWINGS

FIG. 11 shows an in-line mounting.
FIG. 16 shows a female clamping shoe.
FIG. 17 shows a male clamping shoe.
FIG. 18 shows a drop-off assembly.
FIG. 20 shows a drop-off installation.
FIG. 21 shows a drop-off with eU installation.
FIG. 23 shows section E.
FIG. 24 shows implementation section F.
FIG. 25 shows fitting object 10.

DETAILED DESCRIPTION

Figure 1:
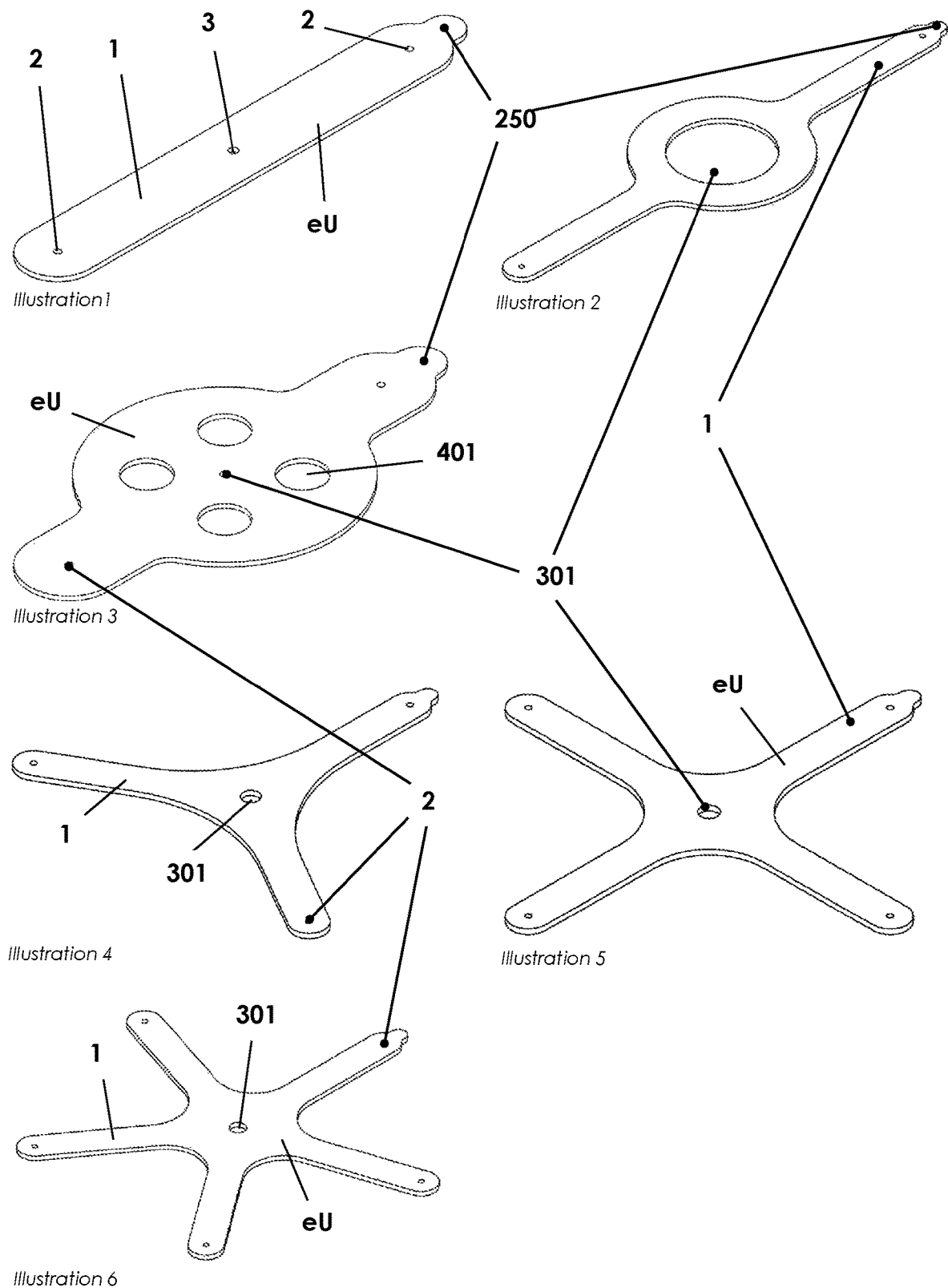
FIG. 1 shows illustrations 1 to 6 for universal clamping.

In accordance with FIG. 1 with its Illustrations 1 to 6, the innovative solution is described in more detail.

Disclosed is a universal clamp for the fastening of arbitrary objects 10 to a fishing line. In order to implement this fastening of arbitrary objects 10, an elastic universal clamp eU is implemented as a central link between the fishing line and the object 10 to be fixed. The elastic universal clamp eU—see Illustrations 1 to 6 of FIG. 1—consists of an elastic, extendible material and can be implemented with two to five fingers 1, according to required hold with reference to the fishing rod condition and technology and the object 10 to be connected. Every finger 1 is provided with a hole 2. The holes 2 of the elastic universal clamp eU serve for connection with corresponding additional parts which are further described below.

Furthermore, a minimum of one finger 1 of the elastic universal clamp eU is provided with a tongue 250. This tongue 250 serves as a grip and improves the handling capability during the mounting of the elastic universal clamp eU. The design implementations of the elastic universal clamps eU are provided with a central hole 301. This serves for the installation of, for example, a float and for the stabilization of the clamped object 10 in general. In case of the elastic universal clamp eU with two fingers 1, the central hole 301 serves for the stabilization of the clamped object 10 during clamping, where it can also be implemented larger—see Illustration 2 of FIG. 1.

Furthermore, the variant with two fingers 1 of the elastic universal clamp eU can be implemented in the central area with a hole pattern 401. The hole pattern 401 offers the possibility to fix the used object even more securely by additional side clamping, and this can be advantageous in case of casting large weights. The different implementation forms in accordance with FIG. 1 and the Illustrations are possibilities for the implementation of the elastic universal clamp eU with two fingers 1 or three, four or five fingers 1 in each case. The object 10 which must be fixed always plays a role.

Figure 12:
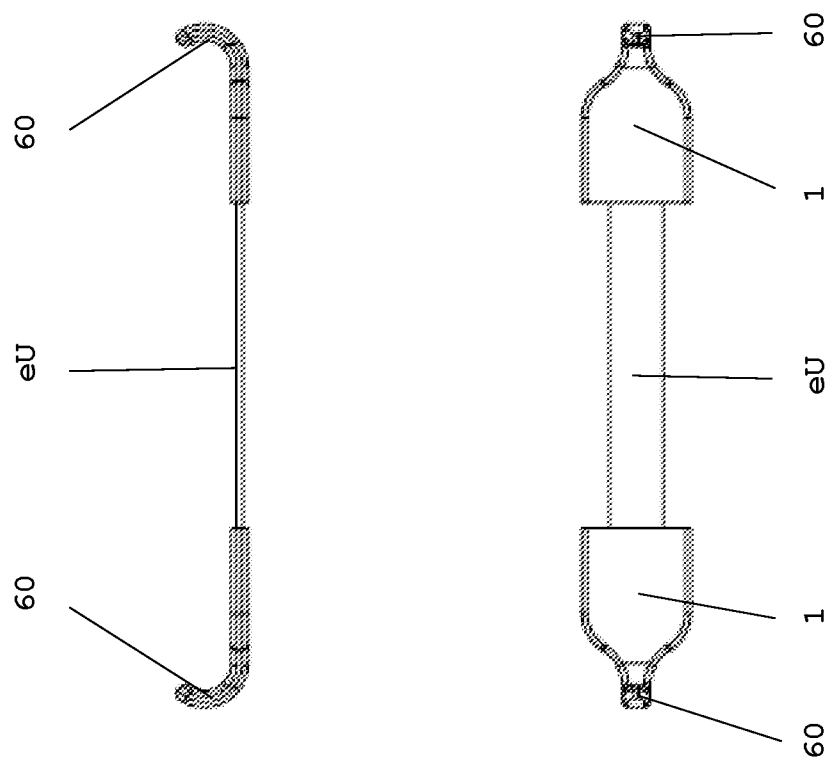
FIG. 12 shows an eU variant.
Figure 12:
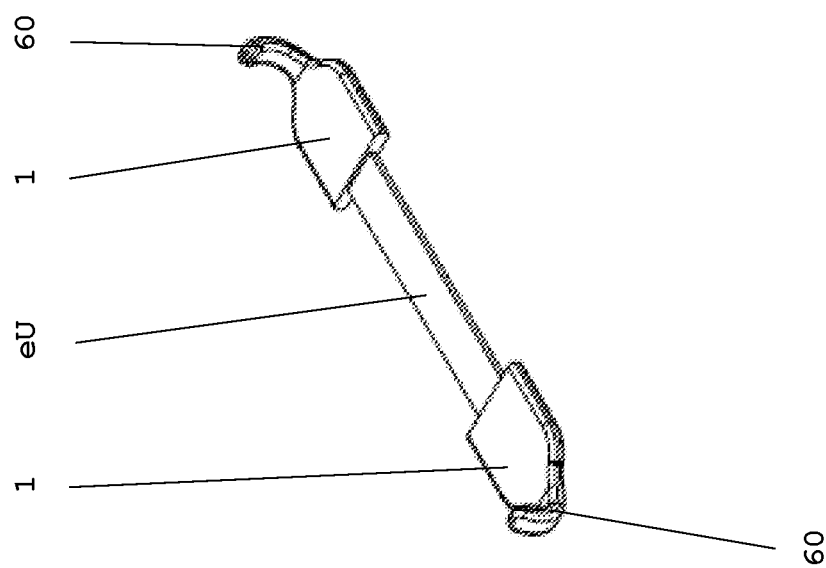
Figure 13:
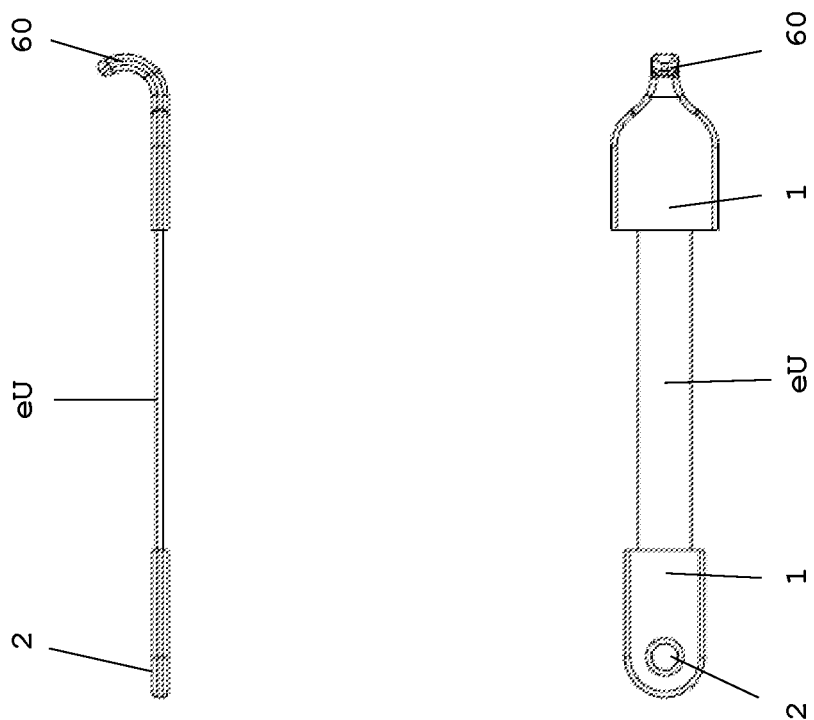
FIG. 13 shows an eU implementation example.
Figure 13:
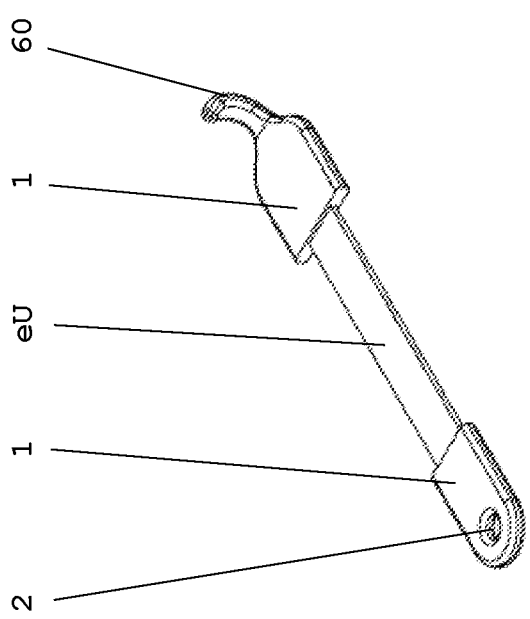
Figure 14:
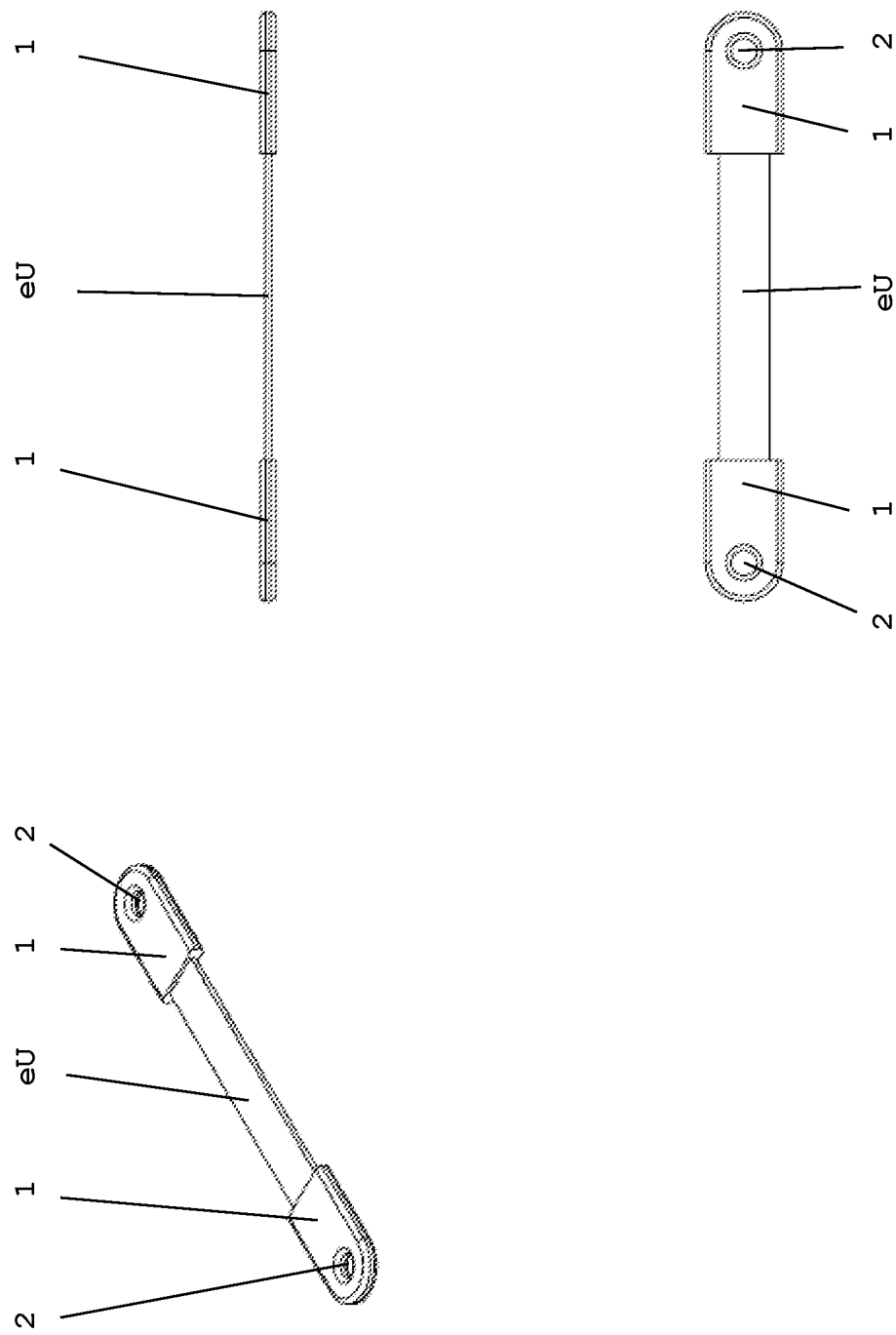
FIG. 14 shows an eU example.

Below in FIGS. 12, 13 and 14 is described an implementation example for the elastic universal clamp eU.

FIG. 12 shows that a fixing hook 60 is provided on the respective fingers 1 of the elastic universal clamp eU. In this case, it involves simple, fixed-connected hooks that can be implemented for the deformation of the elastic universal clamp eU by object 10 with the corresponding anchors described below.

The implementation of the fixing hooks 60 is depicted in FIG. 13, where, for example, a hole 2 as fixing hook 60 and a fastening on the other finger 1 of the elastic universal clamp eU are provided as fixing hooks 60.

A further possibility of the implementation of the elastic universal clamp eU with the respective fingers 1 is provided, in that in FIG. 14 a reinforcement of the holes 2 present on fingers 1, in connection with the elastic universal clamp eU, is implemented.

As depicted in FIGS. 12, 13 and 14, there are different versions of the implementation of the fixing hooks 60 in connection with a connection with the elastic universal clamp eU. In this case, it is also possible to implement riveted joints, loose riveted joints, magnetic connections, fastening options over openings of any type over lugs, over hooks and over loops or slots. A fixed and/or detachable connection of the fastening option is always provided. It is important that the respective elastic universal clamp eU as a fastening option is implemented as an adapter, so that an object 10 can be arranged in it on the fishing line 130 or on corresponding anchors.

The elastic universal clamp eU is combined with different individual parts, according to a modular principle, in order to fulfill different applications. Illustrations 7 to 9, 13 to 16, 22 to 25 and 30 of the respective FIGS. 2, 3, 4, 5, 6, 7, 8, 9 indicate typically developed components which can be used in connection with the elastic universal clamp eU. Illustrations 10, 11, 17, 18 and 32 of the respective figures indicate a selection of commercial standard parts that can also be used in combination with the elastic universal clamp eU. In this case, however, the possible uses are far more versatile, which constitutes a great advantage for this innovative solution. Many further possible applications exist, such as for example the use for flexible loading of a swinger which is a device for indicating bites during bottom fishing, or other component parts.

In addition, buoys or markers for feeding grounds, a piece of wood as well as further targeted objects 10 can also be clamped in the support of the elastic universal clamp eU. Theoretically the angler can use any arbitrary object 10 within the limits of the size used. In order to change characteristics, such as the weight, the buoyancy characteristics, the size, the color or geometry of the object 10 at the fishing place, instead of a range of different lead weights or poses among other things, an elastic universal clamp eU is enough. A flexible adaptation to conditions is enabled by simple replacement of the clamped stone or object 10. Illustrations 12, 19 to 21, 26 to 29, 31 and 33 indicate the elastic universal clamp eU, in combination with different additional parts for the different application states.

Figure 2:
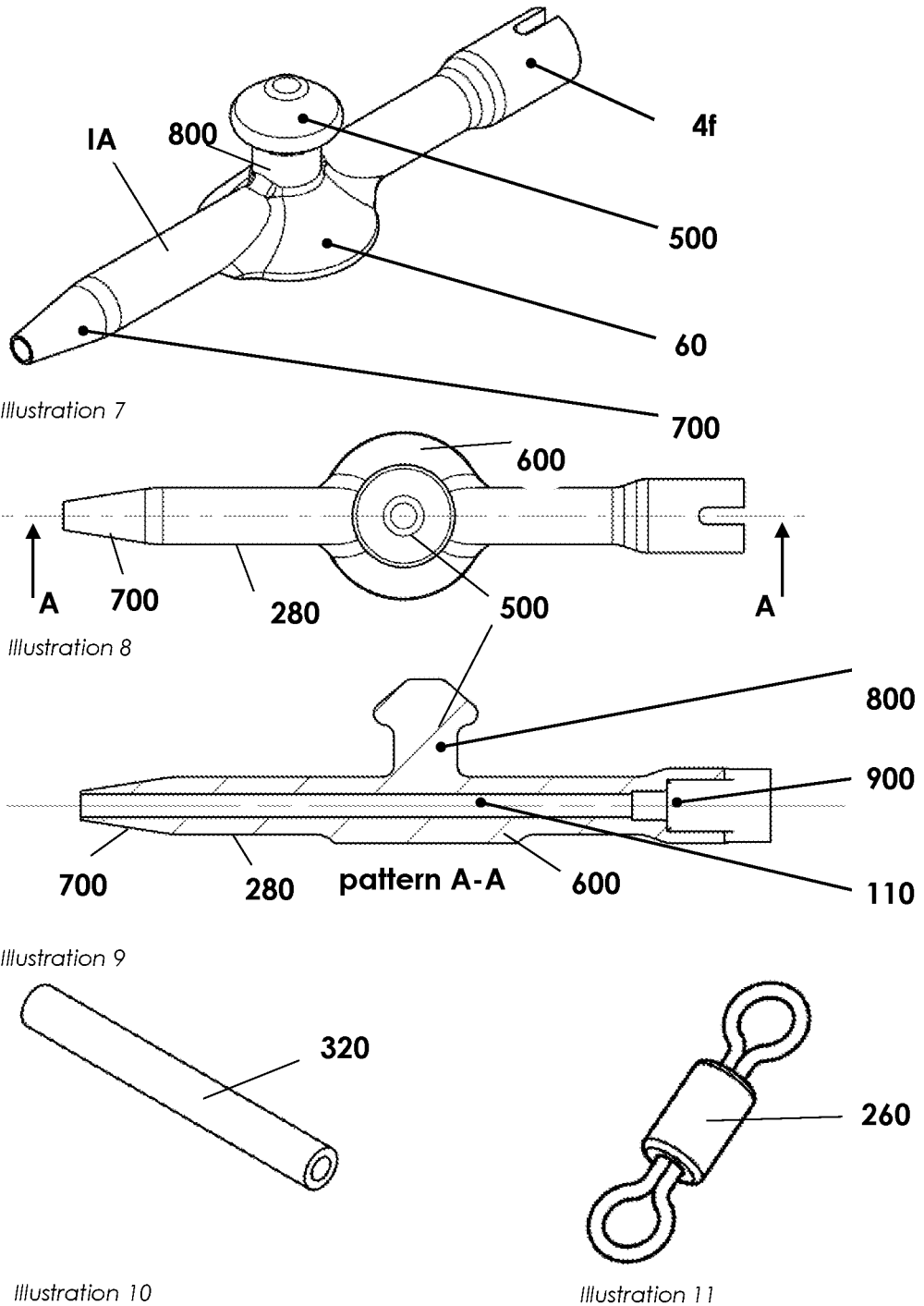
FIG. 2 shows illustrations 7 to 11 for in-line mounting with an in-line anchor.
Figure 3:
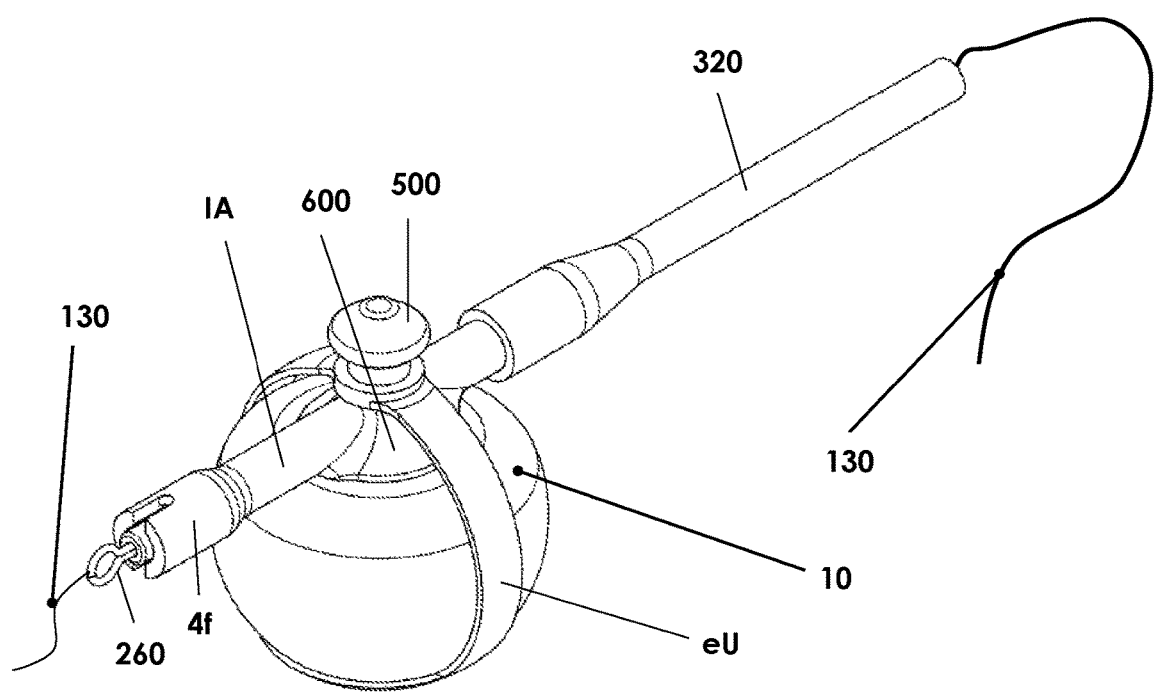
FIG. 3 shows illustration 12 for the complete in-line mounting of the inline anchor.

With reference to FIGS. 2 and 3, an innovative application of the elastic universal clamp eU is described by Illustrations 7 to 12. In this case, an important application with the employment of natural stones as object 10 for bottom fishing is indicated.

Here a possibility exists for so-called in-line mounting, in accordance with Illustration 12 of FIG. 3. In this case an elastic universal clamp eU with three additional parts, such as an inline anchor IA, a hose 320 and a swivel 260, are combined. The attachment of an inline anchor IA is implemented in particular in Illustrations 7 to 11 of FIG. 2. It is an additional component part for the handling of the elastic universal clamp eU, in particular for the utilization of natural stones.

The inline anchor IA has a tapered anchor head 500 with a narrower anchor head support 800, with which the elastic universal clamp eU is latched to the narrower anchor head support 800 over the anchor head 500. For the fixing of an object 10, the respective hole 2 at the end of finger 1 of the elastic universal clamp eU is moved over the anchor head 500 until it encloses the narrower anchor head support 800 and securely sits in the narrower anchor head support 800. Then the elastic universal clamp eU is stretched around object 10 and the opposite hole 2 of finger 1 is equivalently pulled over the anchor head 500. For this, the tongue 250 is provided for improved handling capability and for pulling over the anchor head 500.

The description explains an installation of an elastic universal clamp eU with two fingers 1. As an alternative, however, all versions of the elastic universal clamp eU can be used according to the same principle, in line with the existing situation, requirement and personal choice. Below the anchor head 500 with its following narrower anchor head support 800, a stabilization plate 600 is provided in order to act against the tilting at the object 10 and to define the alignment of the seating exactly orthogonal to the surface of the object 10.

FIG. 2 with the Illustrations 7 to 9 shows the structure of the inline anchor IA. The inline anchor IA is composed of an anchor head 500, a following narrower anchor head retention 800 and a transition into a stabilization plate 600. Horizontal with this is a tube formation 280, in which a fishing line conduit 110 is provided for the introduction of the fishing line 130 and a hollow space 900 for a latching 4*f*.

The tube formation 280 on the left is produced with a taper 700 in this case. As a result of the taper 700 on the tube formation 280, it is possible to implement the mounting of a hose 320. The hose 320 opposes the rotation of the fishing line 130 around the mounting with casting or dropping in the water. Different alternative possibilities exist to avoid such a rotation, where every angler has their favorite. Accordingly, the hose 320 is to be considered as an optional part which completes the function of the mounting. The in-line mounting of the inline anchor IA can also be used without the utilization of the hose 320 on the taper 700. The right-hand end of the inline anchor IA is provided with a fixing 4*f* for a standard barrel swivel 260. The barrel swivel 260 in this case is inserted into the hollow space 900 provided. In this hollow space 900, space is also provided for the knot on the barrel swivel 260. With insertion of the barrel swivel 260, the two jaws of the fixing 4*f* bend open slightly, where a pressing force is generated that fixes the barrel swivel 260 and accordingly positions the mounting fixed on the fishing line 130. Such a spiral fixing is required, for example in case of fishing with a fixed lead mounting with self-snagging effect.

If the angler wishes to let the mounting of the inline anchor IA and the fishing line conduit 110 run free on the line, either a bead can be set on the fishing line 130 before the swivel fixing or the hose 320 left out and the inline anchor IA threaded the other way round onto the fishing line 130. Therefore, with assembly of the in-line mounting of the inline anchor IA, optionally a hose 320 and after that the inline anchor IA are threaded onto the fishing line 130. Then the barrel swivel 260 is tied up with the fishing line 130 and clamped into the spiral fixing. On the second lug of the swivel is fixed a second fishing line 130 in order to thus place the hook at the end. After the mounting of the inline anchor IA has been prepared in this manner, an arbitrary object 10 or an arbitrary weight, for example a natural stone, is clamped into the elastic universal clamp eU (see Illustration 12 in FIG. 3). It is equally possible, subject to choice, to clamp the object 10 first or at the end after fastening of the inline anchor IA on the fishing line 130 in the elastic universal clamp eU.

In FIG. 3 a complete in-line mounting of the inline anchor IA is implemented in accordance with Illustration 12. It can be seen here that an object 10 is latched over the inline anchor IA and the elastic universal clamp eU. As can be seen from the solution, it is possible here to latch the different forms of the eU universal clamp visible in FIG. 1 depending on object 10. The holes 2 of the respective elastic universal clamp eU are always latched over the anchor head 500 to the narrower anchor head support 800. With the tightening of the elastic universal clamp eU, the object 10 is then securely held over the anchor head 500 to the narrower anchor head support 800.

Figure 4:
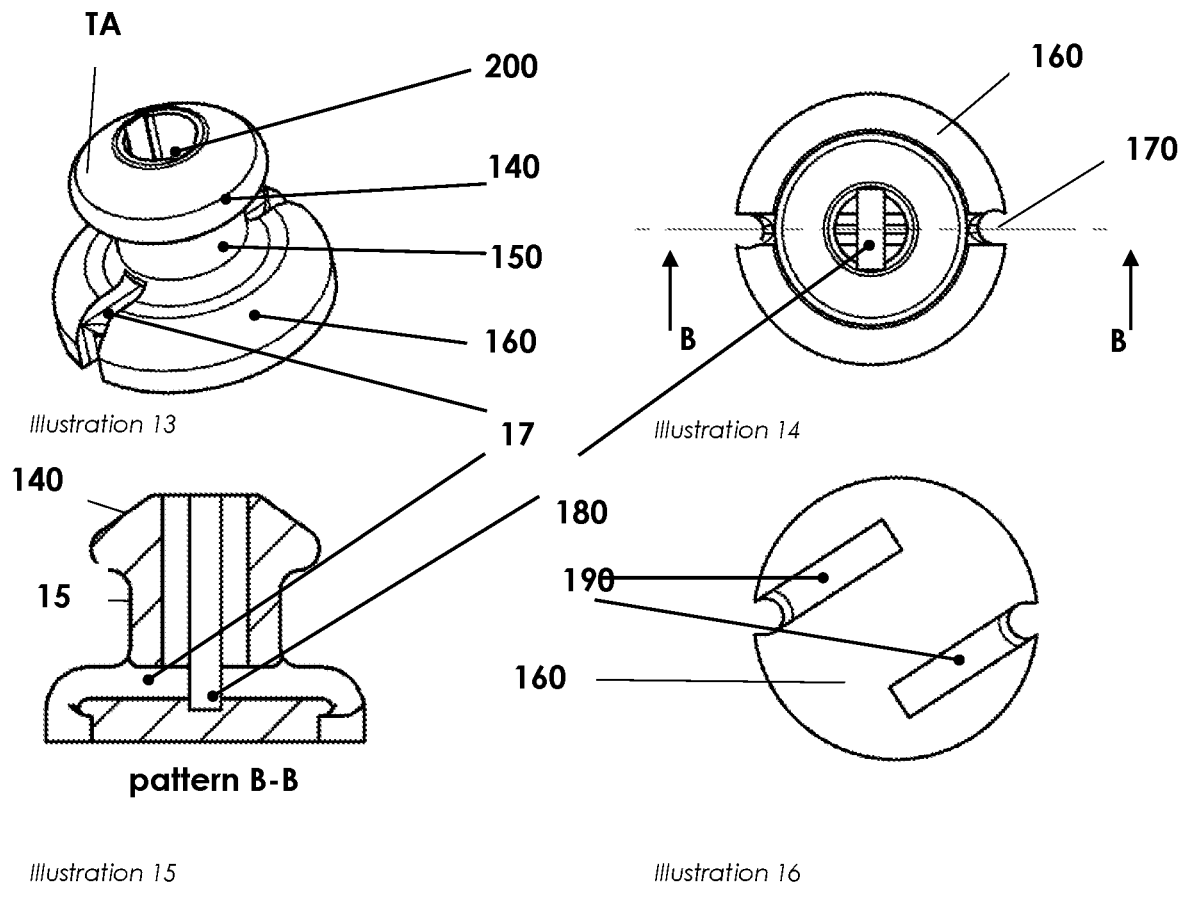
FIG. 4 shows illustrations 13 to 16 for the drop fittings of a drop anchor.
Figure 5:
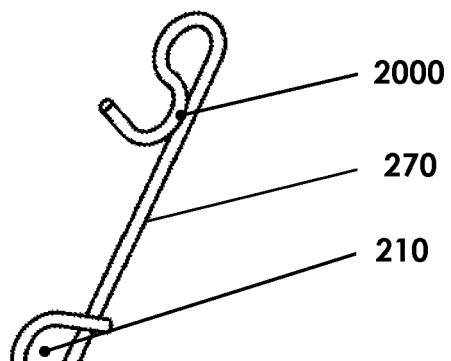
FIG. 5 shows illustrations 17-21 for the drop fitting of a drop anchor.
Figure 5:
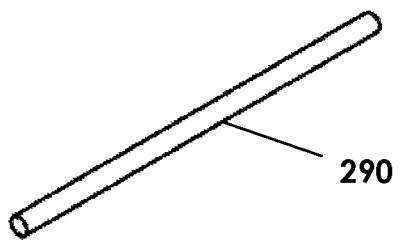
Figure 5:
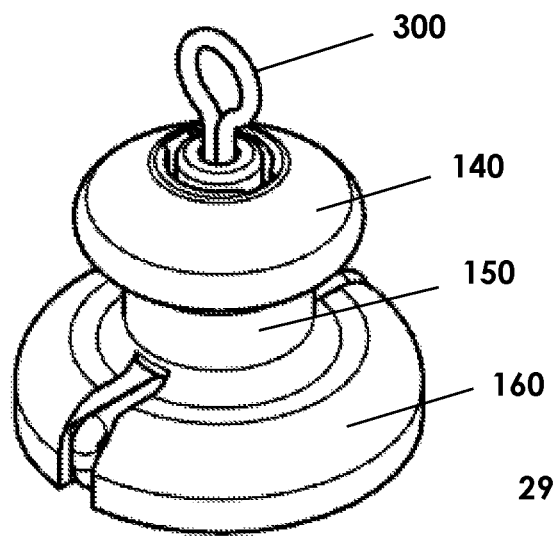
Figure 5:
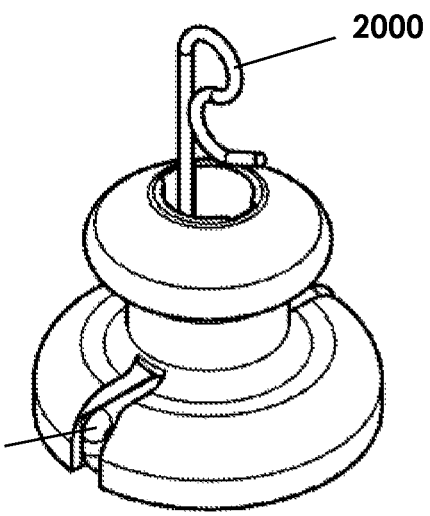
Figure 5:
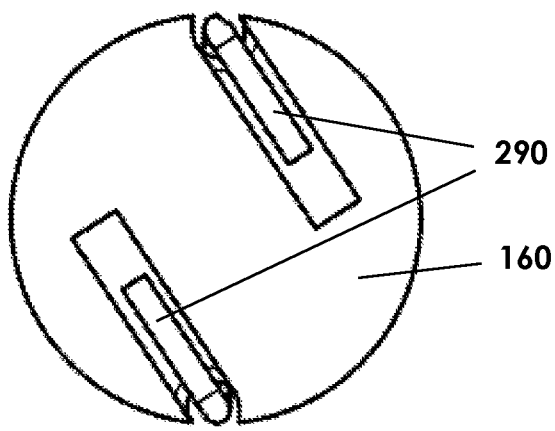

In FIG. 4 with Illustrations 13 to 16, as well as in FIG. 5 with Illustrations 17 to 21, a TA drop anchor is described as a further additional piece for the elastic universal clamp eU. A TA drop anchor is provided, which in this case is implemented with a head 140, a following narrow head support 150 and a following cover plate 160. The narrow head support 150 serves here for the latching of the elastic universal clamp eU over the holes 2 of finger 1. The elastic universal clamp eU with the hole 2 of the finger 1 is thus placed over the head 140 to the narrow head support 150.

The cover plate 160 serves to ensure the proper positioning with respect to object 10 in this case. The round form of the cover plate 160 enables the universal employment of the TA drop anchor for all versions of the elastic universal clamp eU.

However, the cover plate 160 can also be specialized for the different elastic universal clamps eU. Therefore, the cover plate 160 from FIG. 6 results in different forms with the Illustrations 22 to 25. Here it involves an H-shape for a 2-finger variant of the elastic universal clamp eU, in each case different crosses for the 3-finger and 4-finger clamp or the star-shape for the 5-finger clamp of the elastic universal clamp eU, according to implementation form. The special forms of the cover plates 160 of these implementations or the included indentations guarantee a defined seating of the fingers 1 of the elastic universal clamp eU on the corresponding TA drop anchor. In order to use a form of the TA drop anchor, this is pre-assembled first. A barrel swivel of known construction type is inserted into the head 140 in the planned conduit 200 of the TA drop anchor.

The integrated guide 180 in this case allows only an alignment of the swivel lug of the swivel 300. The swivel 300 is pushed so deep into the conduit 200 that one of the lugs of the swivel 300 contacts the base of the guide. Then the wire 290 in defined length is pushed through the sunk swivel lug of the swivel 300, see Illustration 18 of FIG. 5, into the wire channel 170, until it is positioned centrally to the TA drop anchor. Finally, both protruding wire ends of the wire 290 are bent and sunk into the corresponding indentations 190 of the TA drop anchor on the underside of the cover plate 160 and buckled. This provides the pre-mounting of the TA drop anchor.

Equally, this mounting process of the TA drop anchor can be implemented with a knot-free connector 270, which is provided from a thin wire for the connection of two fishing lines without the necessity of a knot, see Illustrations 17 and 20 of FIG. 5. Here the knot-free connector 270 with its lug 210 is pushed forward into conduit 200 and equivalently fixed with the wire 290; see preceding description.

While the swivel 300 indicates a closed lug form, the clamping lug 2000 of the knot-free connector 270 enables a subsequent suspension of the TA drop anchor in the fishing line 130. In case of utilization of sinker weights, this can serve for the sinking of the fishing line 130 to the water body bottom, for example on used conduits, or enables the subsequent suspension of, for example, a float in the existing mounting without having to alter it completely. The swivel 30, on the other hand, compared to the knot-free connector 270, is threaded onto the fishing line 130 and can only be released by cutting the fishing line 130.

A further difference between swivel 300 and knot-free connector 270 is the rotating mobility of swivel 300 in contrast to the stiff form of the knot-free connector 270. After the TA drop anchor is pre-mounted, an object 10 is now connected with the mounting using the elastic universal clamp eU. Two procedures are possible here: either all fingers 1 of the elastic universal clamp eU are first pulled onto the narrow head support 150 via the head 140 and then tightened to the object 10 or, for the time being, only one finger 1 is fixed on the TA drop anchor, the object 10 is pressed onto the cover plate 160 and the individual fingers 1 of the elastic universal clamp eU are tightened around object 10.

Figure 7:
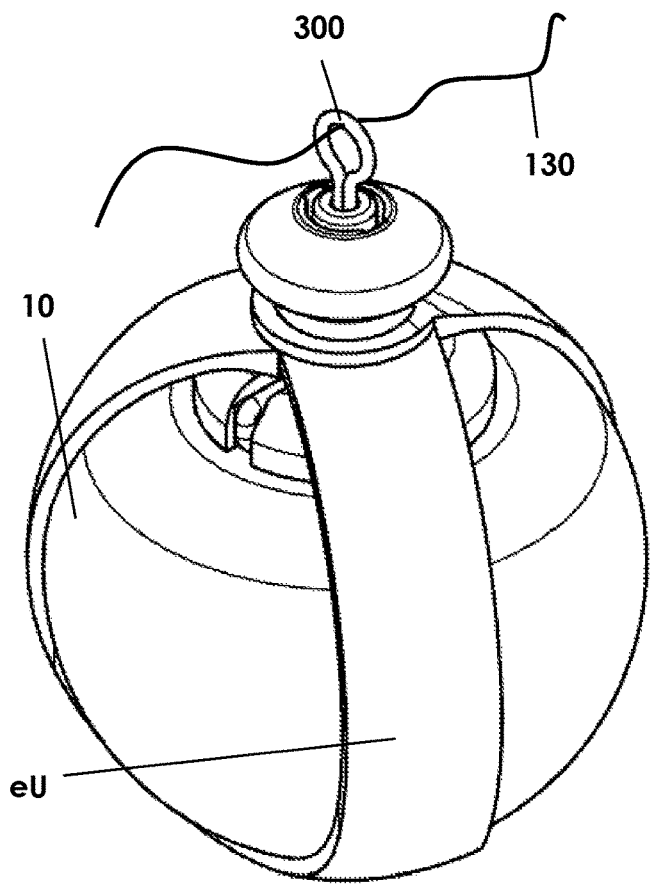
FIG. 7 shows illustrations 26-29 for the application of a universal clamp with drop anchor.
Figure 7:
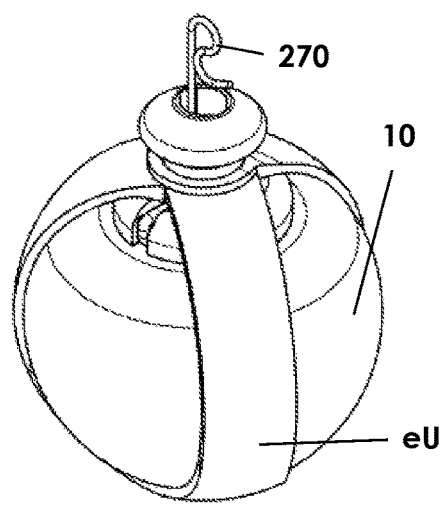
Figure 7:
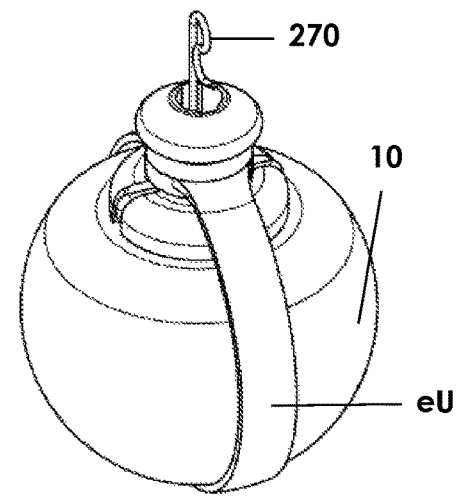
Figure 7:
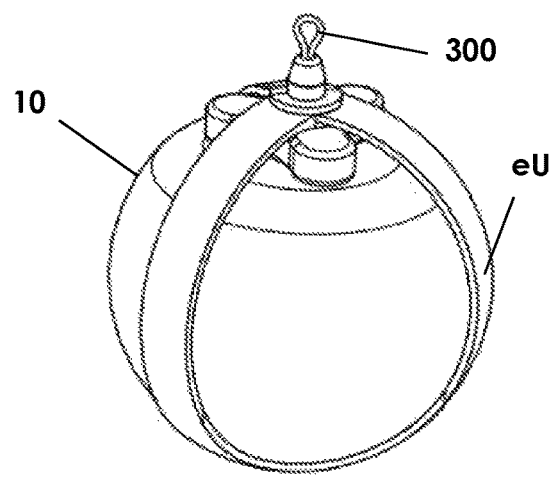

Illustrations 26 to 29 of FIG. 7 show some examples of possible combinations of different drop anchors TA with a swivel 300 or a knot-free connector 270 and different versions of the elastic universal clamp eU. A mounting of the TA drop anchor is indicated in Illustration 26 with a swivel 300 and three fingers 1 of an elastic universal clamp eU. Illustration 27 shows a mounting of a drop anchor TA with a knot-free connector 270 where a 3-finger variant of the elastic universal clamp eU is likewise provided. Illustration 28 shows a 2-finger variant of the elastic universal clamp eU with a knot-free connector 270. Illustration 29 shows a 3-finger variant of the elastic universal clamp eU and a pre-mounted three-arm TA drop anchor where a swivel 300 is likewise pre-mounted.

Figure 6:
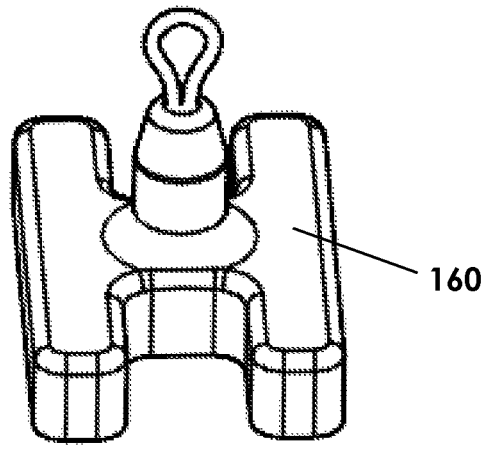
FIG. 6 shows illustrations 22-25 for the application form of a drop anchor.
Figure 6:
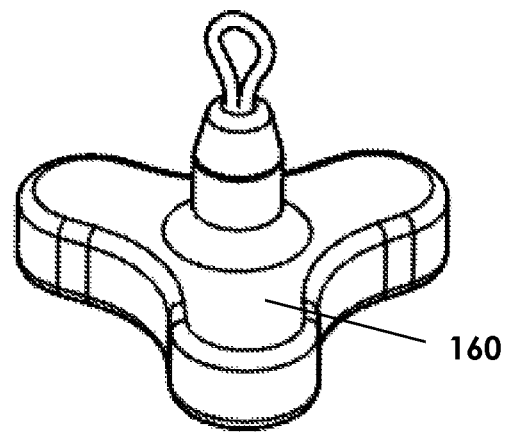
Figure 6:
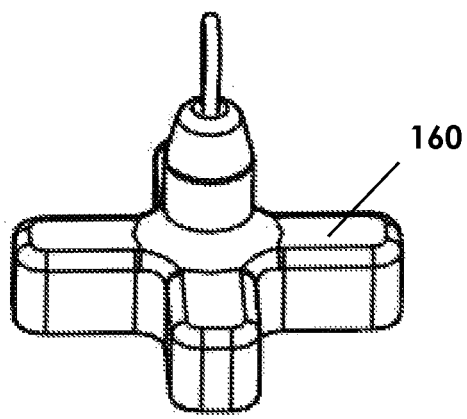
Figure 6:
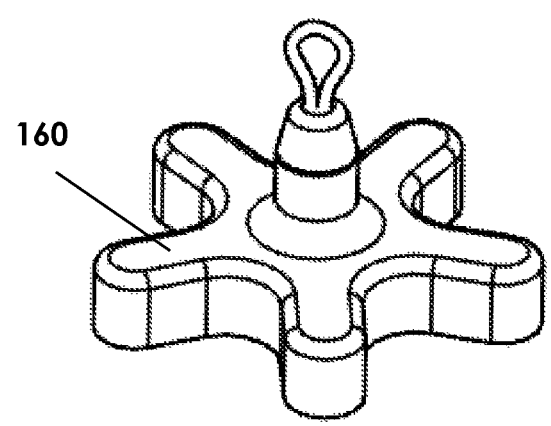

These pre-mounting options based on the different versions of the form of the cover plate 160 of the TA drop anchor and the different insert guides, such as swivel 300 or knot-free connector 270 and other additional devices, are each shown in Illustrations 22 to 25 in accordance with FIG. 6.

Both the mounting of an inline anchor IA and a drop anchor TA can be used as a drop-off mounting by the utilization of the 2-finger elastic universal clamp eU. For this, an object 10 is clamped decentralized at the external edge. This type of fastening offers sufficient hold to release the mounting from the boat. However, if an abrupt force acts through a bite or impact on the respective mounting, then the object 10 is unscrewed and detaches from the elastic universal clamp eU. Casting with the fishing rod is accordingly not possible with the arrangement as described. Preferably a stone of any shape and type is used for object 10.

Figure 8:
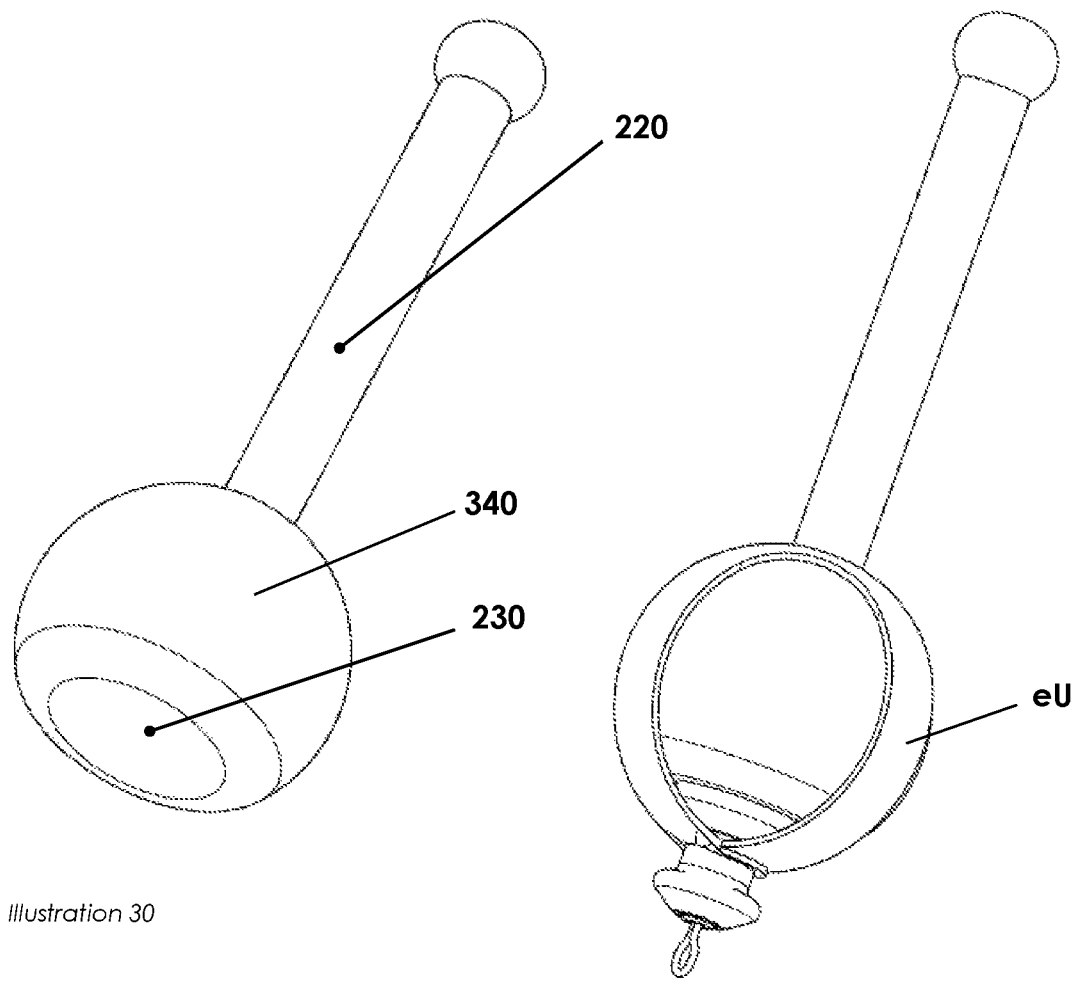
FIG. 8 shows illustrations 30 and 31 for float fitting a drop anchor.
Figure 9:
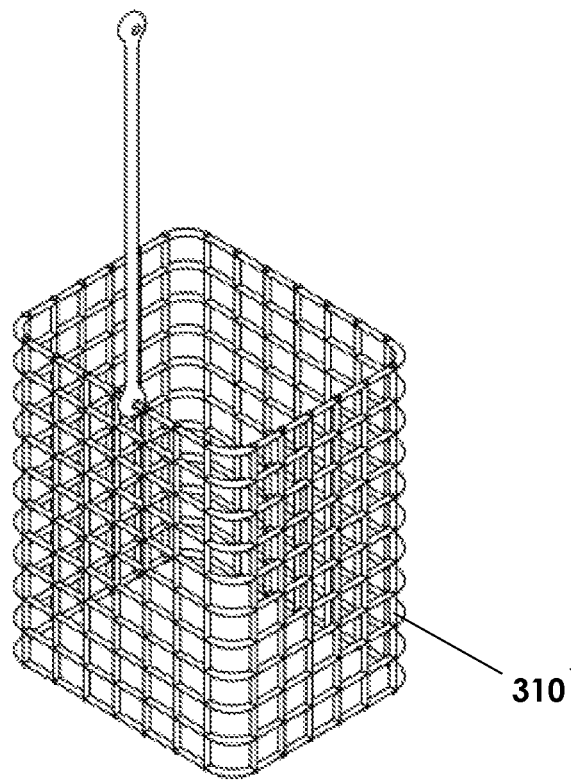
FIG. 9 shows illustrations 32 and 33 for feed basket fittings.
Figure 9:
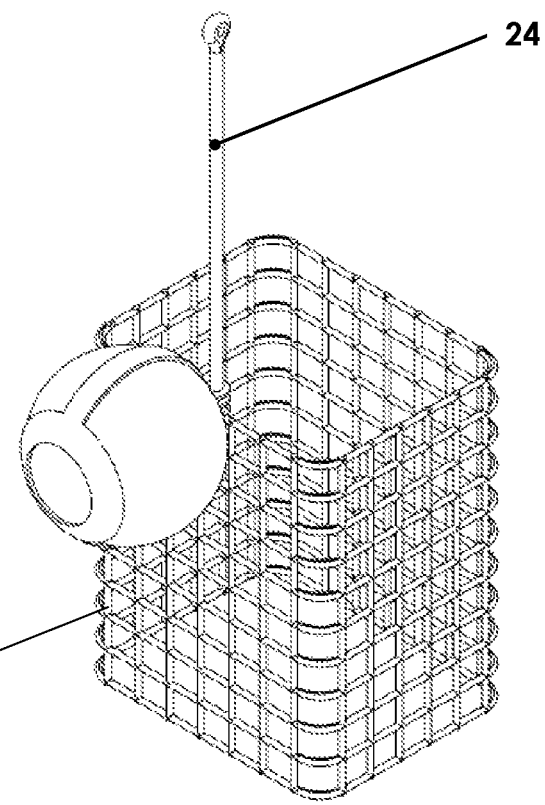

FIG. 8 describes another application form of a float mounting. Illustration 30 shows a specially adapted float 340 for the elastic universal clamp eU. It enables the all-round angler a fast change between bottom and float fishing on the water body surface. This increases the flexibility of a modular concept, which forms the basis for this innovative solution.

When the observant angler sees fish movement on the surface, they can adapt their mounting within a very short time by exchanging the clamped object 10 with the float 340. The rod-shaped tip 220 of the floater of float 340 is inserted through the central hole 3 of the elastic universal clamp eU for fixing. The flattened underside 230 of the float 340 sits on the cover plate 160 of the TA drop anchor. The convex area of the floater of the float 340 is enclosed by fingers 1 of the elastic universal clamp eU (see Illustration 31 in FIG. 8). Here a 3-finger variant of the elastic universal clamp eU with the drop anchor, a swivel 300 and the float 340 is preferably depicted by way of example. In this case also, all versions of the clamp are practicable with many different fingers 1 of the elastic universal clamp eU and the different versions of the TA drop anchor.

A further implementation variant is provided with feed basket fitting. Here, an elastic universal clamp eU is combined with off-the-shelf standard parts such the previously mentioned feed basket 310. For this, all fingers 1 of a variant of the elastic universal clamp eU are moved over a fastening rod 240 of the feed basket 310 with the given holes 2. Then the object 10 can be clamped. Alternatively, the different procedures for clamping the object 10 are also possible here. This manner of the application enables flexible change between a lighter and heavier feed basket 310 in order to, for example, change the possible cast range or to prevent drifting off with the current. Theoretically a larger floater that carries the weight of the basket could also be clamped. In this way, the bait could float below a float at the mean water level, while the feed trickles from the basket directly down to it, forming a fragrance cloud.

A solution is provided with FIGS. 10a, 10b, 10c, and 11a, 11b, 11c, 22d of a further inline anchor IA2 as well as its mounting with the elastic universal clamp eU. The inline anchor IA2 has a tapered anchor head 410 with a narrower anchor head support 49, with which the elastic universal clamp eU is latched over the anchor head 41 to the narrower anchor head support 490. For the fixing of an object 10, the respective hole 2 at the end of the finger 1 of the elastic universal clamp eU is moved over the anchor head 410 until it encloses the narrower anchor head support 490 and is seated securely in the narrower anchor head support 490. Then the elastic universal clamp eU is stretched around object 10 and the opposite hole 2 of finger 1 is pulled equivalently over the anchor head 410. For this, the tongue 250 is present on the elastic universal clamp eU for improved handling capability and for pulling over the anchor head 500.

The description explains a mounting of an elastic universal clamp eU with two fingers 1. As an alternative, however, all versions of the elastic universal clamp eU can be used according to the same principle, in line with the respective situation, requirements and personal choice. The underside 480 of the inline anchor IA2 has a slight bowing, since a lot of objects used in the fishing sector feature curved placement surfaces. As a result of the bowing, tilting on the object 10 is counteracted and the alignment of the seating defined orthogonal to the surface of object 10 to the greatest degree possible.

Figure 10:
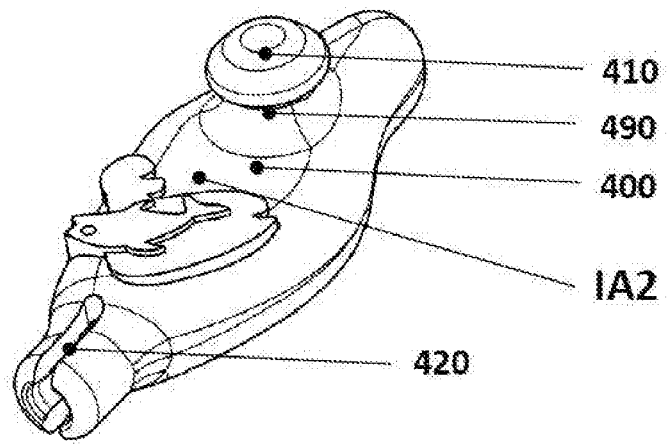
FIG. 10 shows IA 2.
Figure 10:
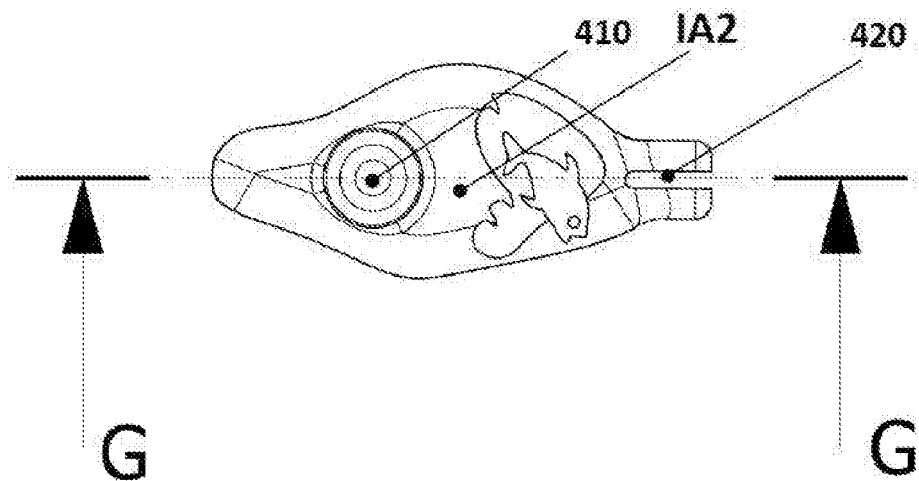
Figure 10:
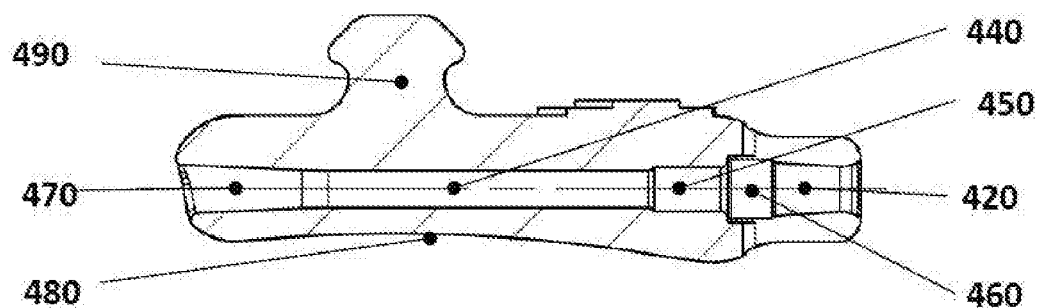

The structure of the inline anchor IA2 is shown in FIG. 10 with subordinate FIGS. 10a, 10b and 10c. The inline anchor IA2 in this case is composed of an anchor head 410, a following narrower anchor head retention 490 and a transition into the anchor body 400. Within the anchor body, horizontal to it, are provided a fishing line conduit 440 for the introduction of the fishing line 130 and a hollow space for a latching 420.

The fishing line conduit 440 is produced tapered 470 on its left-hand side in this case. As a result of the taper 470 in the fishing line conduit 440, it is possible to implement the mounting of a hose 320. The hose 32 here is inserted into the taper 470. It thus counteracts rotation of the fishing line 130 around the mounting when casting or dropping into the water. Different alternative possibilities to avoid such rotation exist and every angler has a favorite. Accordingly, the hose 320 is to be considered as an optional part that completes the function of the mounting. The in-line mounting of the inline anchor IA2 is also usable without the utilization of the hose 320 in the taper 470. The right-hand end of the inline anchor IA is provided with a fixing 420 for a off-the-shelf standard barrel swivel 260. In this case, the barrel swivel 260 is inserted into the hollow space of the swivel fixing 420 provided. Furthermore, there is a space provided in the hollow space 450 for the knots on the barrel swivel 260. With inserting the barrel swivel 260, the two jaws of the fixing 420 bend open slightly, generating a clamping force that fixes the barrel swivel 260 and accordingly positions the mounting fixed on the fishing line 130. The cut-out 460 near the swivel fixing ensures exactly defined contact areas between the swivel 260 and the clamping jaws of the swivel fixing 420. A swivel fixing is required for example when fishing with a fixed lead mounting with self-snagging effect.

If the angler wishes to allow the mounting of the inline anchor IA2 or the fishing line conduit 440 to run freely on the line, a bead 501 can be set before the swivel fixing 420 on the fishing line 130. With assembly of the in-line mounting of the inline anchor IA2, a hose 320 is therefore optionally threaded onto the fishing line 130 and after that the inline anchor IA2. Then the barrel swivel 260 is tied with the fishing line 130 and tightened into the swivel fixing. A second fishing line 600 is fixed on the second lug of the swivel in order to place the hook at the end. After the mounting of the inline anchor IA2 has been prepared in this manner, any arbitrary object 10 or any arbitrary weight, for example a natural stone, is now clamped into the elastic universal clamp eU (see FIGS. 11c and 22d in FIG. 11). It is likewise possible, depending on choice, to clamp the object 10 first or at the end after fastening the inline anchor IA2 on the fishing line 130 in the elastic universal clamp eU.

Figure 22:
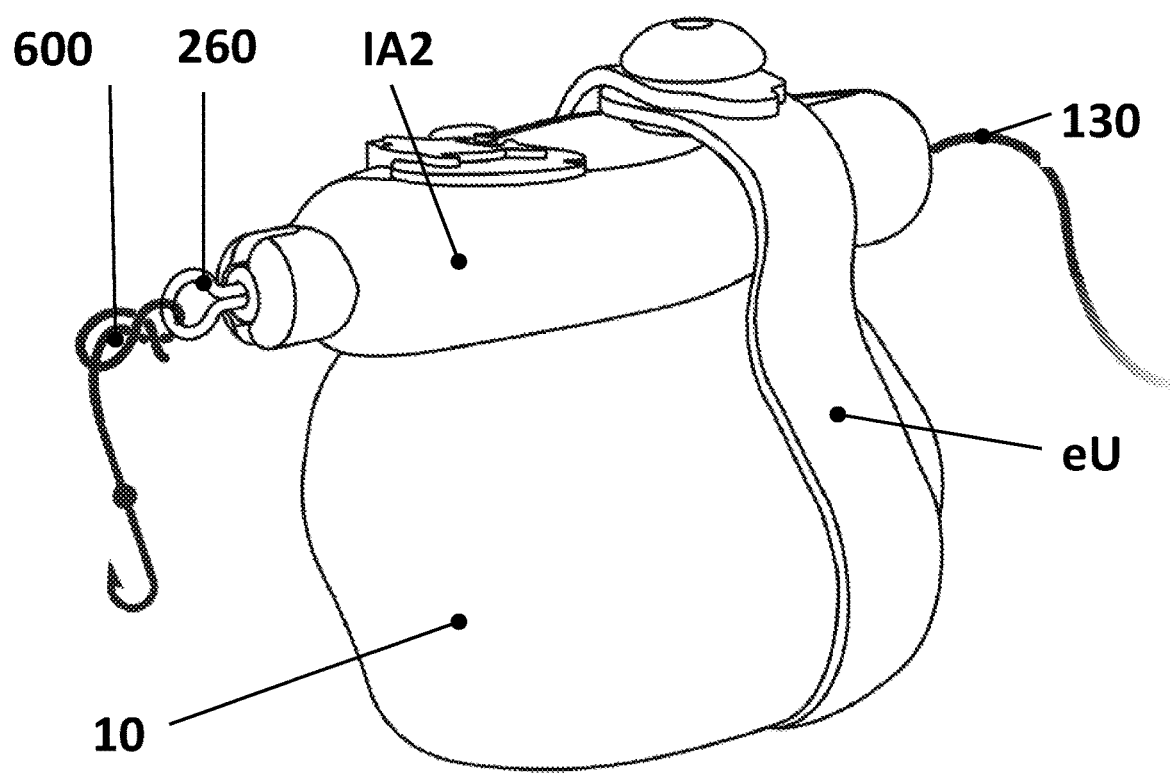
FIG. 22 shows a stone fitting.

In FIG. 11 and in FIG. 22, a complete in-line mounting of the inline anchor IA2 is implemented. It can be seen here that an object 10 is latched over the inline anchor IA2 and the elastic universal clamp eU. As the solution demonstrates, it is possible here to latch the different forms resulting from the elastic universal clamp eU visible in FIG. 1, depending on object 10. The holes 2 of the respective elastic universal clamp eU are always latched over the anchor head 410 to the narrower anchor head support 490 in this case. The clamping of the elastic universal clamp eU over the anchor head 410 towards the narrower anchor head support 49 thus locks the object 10 in place.

The significant advantages of this innovative solution lie in the great number of universally interchangeable individual parts, all based on the central element of the elastic universal clamp eU. By simple exchange according to a modular concept, the same elastic universal clamp eU is used in order to flexibly cover most practiced forms of fishing.

Anglers therefore do not require a large number of different parts for every fishing method as before; rather, they extend the elastic universal clamp eU through further features in order to use it for their required fishing method. The utilization of the elastic universal clamp eU enables fast change between different objects 10 through simple re-clamping. Accordingly, the fishing fittings can be flexibly changed and adapted to conditions such as current, wind, fishing sighting and cast distance, and factors such as color of the bottom and water turbidity. For example, stones can be collected simply on site as weights for bottom fishing.

The innovative solution is described below in general and in further design examples.

So, there is demand for an ecological, natural replacement for a mounting where loss of the weight after a bite is knowingly included. The described invention supplies an integrated, flexible alternative solution for the utilization of traditional drop-off mountings. The drop-off mounting offers the possibility, with the use of any arbitrary objects, preferably natural stones, to throw off the fishing weight after the fish bite and execute play on a free tendon. It offers a defined seating of the object and is designed for a checked release with a defined tensile force on both sides. As a result of the fixed clamp of the object and further explained technical components, casting with this drop-off mounting is possible.

This mounting was developed with carp fishing in mind; however, its use is not confined exclusively to this area. With this mounting, fishing is mainly on the water body bottom, where the possibility also again exists to clamp arbitrary buoyant objects. The most appropriate version according to current understanding, however, is bottom fishing with a comparatively heavy weight, which intentionally detaches from the mounting during playing. This technology increases the chances of success during playing owing to the factors previously described in the section on state of the art. The drop-off mounting with its obvious advantages attracted interest especially among very specialized carp anglers. However, it failed to break into the market, presumably because of the negative ecological impact of intentional release of solid lead into water bodies. Carp anglers place high value on the treatment of the water body and the well-being of fish. The devised drop-off mounting using stones optimizes the products on the market with regard to natural camouflage, offers decisive ecological advantages and makes fishing effective through increased flexibility and the options for customization.

Figure 15:
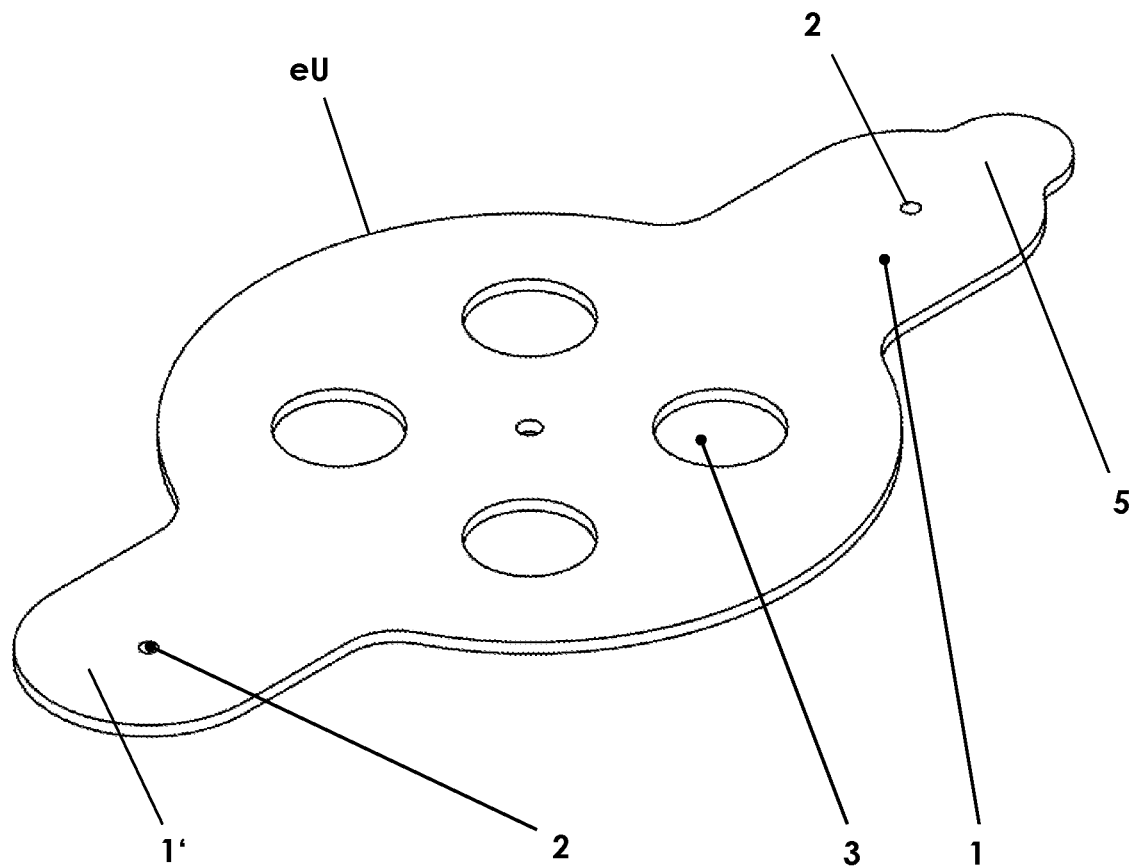
FIG. 15 shows an elastic universal clamp.

Below the implementation example is described by means of the following figures:

FIG. 15 Elastic universal clamp
FIG. 16 Female clamping shoe
FIG. 17 Male clamping shoe
FIG. 18 Drop-off mounting.

FIG. 15 shows the invention of an elastic universal clamp 6. The elastic universal clamp 6 consists of an elastic, extendible material. It is equipped with two fingers 15, 1'. Every finger is provided with a hole 2. These holes 2 serve for connection with the clamp fasteners, which are explained below. In addition, the universal clamp 6 is provided with a type of hole pattern 3 in the central area. The hole pattern 3 offers the possibility to fix the object used even more securely by additional side clamping. This can be advantageous when casting with large weights.

A tongue 5 is provided on the finger 15 of the elastic universal clamp 6, which is useful for improving the clamping and fixing with the respective clamp fasteners. The connection between the elastic universal clamp 6 and a clamp fastener is implemented over the respective holes 2. The shaping of the elastic universal clamp 6 can be circular or rounded, as shown in FIG. 15, or rectangular or square, as shown in FIG. 18. This corresponds to the application of the elastic universal clamp 6 and the objects 10 that are to be held. Since the object 10 mostly involves stones that usually are rounded, the shaping shown in FIG. 15 results. The material used for the elastic universal clamp 6 can be preferably rubber, caoutchouc or also other elastic material that is tear-resistant and provides corresponding elasticity for the clamping of the object 10.

For the drop-off mounting, two clamp fasteners were developed, where in the following differentiation is made between male and female clamping shoe 40 and 13. In this case, it involves two parts that together form a snap-on connection. This snap-on connection represents the basis for the drop-off effect.

The female clamping shoe 13 is described in FIG. 16 with FIGS. 16a, 16b, 16c, 16d and 16e. The female clamping shoe 13 with the receptacle component part of the snap-on connection 29 serves in this case as a connecting piece. It is a question here of two snap jaws 15 and 15' which enclose the axially cut-off cylindrical form of the male clamping shoe 40 in the form of the snap-on connection 33. The stop plate 26 of the female clamping shoe 13 serves as a limit stop when composing the female clamping shoe 13 and the male clamping shoe 40. The seating of the finger 1 of the elastic universal clamp 6 is implemented with the round slot 28 between the stop plate 26 and the main body of the female clamping shoe 13. At the upper end of the female clamping shoe 13 is a fixing 4 with a slot form for a standard barrel swivel 14 (FIG. 16e). The barrel swivel 14 in this case is inserted into the provided hollow space 9 over the fixing 4. Room for a knot on the barrel swivel 14 is also provided in this hollow space 9. With insertion, the two jaws of the fixing 4 are bent slightly open, where a clamping force is generated that fixes the barrel swivel 14 and accordingly positions the mounting securely on the fishing line 12. Such a swivel fixing is required, for example, when fishing with a fixed lead mounting with self-snagging effect. The hollow space 42 for the fishing line 12 within the female clamping shoe 13 begins after the swivel fixing and ends with a side guide 27 at the edge of the female clamping shoe 13, in accordance with FIG. 16b. This structural part prevents severe bending of the fishing line 12 during mounting and guarantees the correct progress of the fishing line 12 with re-clamping object 10.

The following figures show the individual representations:

FIG. 16a Drop-off—female clamping shoe 13 in a top view
FIG. 16b Female clamping shoe 13 in a lower view
FIG. 16c Female clamping shoe 13 in a side view
FIG. 16d Female clamping shoe 13 in a sectional view to the side
FIG. 16e Barrel swivel 14

The principal features of the female clamping shoe 13 are characterized in that a fixing 4 is provided above the clamping shoe and a hollow space 9 in the interior, which is useful for the fixing of the barrel swivel 14. A fishing line is integrated into the hollow space 42 (see FIG. 16d and FIG. 17d).

Furthermore, a discharge of the fishing line takes place over the hollow space 42 in the side guide 27. Following this, at the front tip of the female clamping shoe 13 below, there is a round slot 28 for the fastening of the elastic universal clamp 6. On this is located a connecting plate 26 with the respective snap jaws 15 and snap jaws 15' of the female snap-on connection 29.

FIG. 16d shows a sectional view C-C from out of FIG. 16b. Here, a hollow space 42 is provided for a fishing line in the clamping shoe shaft 13, where the fixing 4 and the side guide 27 for the fishing line 12 are visible.

FIG. 16e shows a standard barrel swivel 14.

FIG. 17, with its subordinate FIGS. 17a, 17b, 17c, 17d and 17e, shows the male clamping shoe 40 of the drop-off mounting. This likewise includes a hollow space 42 for the fishing line 12 and a side guide 41 for the fishing line 12. Furthermore, a stop plate 43 of the male clamping shoe 40 is provided, on which the respective side walls 32 and the snap-on connection 33 are located opposite the female clamping shoe 13. Here, the snap-on connection 33 is limited on both sides of a side wall 32 with the male clamping shoe 40. The separation distance between the side walls 32 is designed so that the female snap-on connection 29 fits in between with some play. Furthermore, the side walls 32 serve as a rotation block, since a rotating load would influence the release force, making the required effect more difficult to control. A further detail of the male clamping shoe 40 is the implementation of the tip 31. This enables the mounting of a hose 11, in accordance with FIG. 17e. The hose 11 acts in rotation against the fishing line 12 around the mounting, with casting or dropping in the water. The hose 11 with set-up on the tip 31 of the male clamping shoe 40 is an ideal solution to prevent rotation.

The male clamping shoe 40 is illustrated in the individual figures, where FIG. 17a gives a general view of the male clamping shoe 40 and FIG. 17b indicates a lower view of the male clamping shoe 40. FIG. 17c shows a side view of the male clamping shoe 40 and FIG. 17d a sectional view D-D of the male clamping shoe 40. FIG. 17e includes a general representation of the hose 11, which is latched onto the tip 31 of the male clamping shoe 40. The male clamping shoe 40 is structured so that, at the upper end of the shaft of the male clamping shoe 40, a tip 31 is formed with hollow space 42 up to the side guide 41 of the fishing line 12. Below the shoe formation of the male clamping shoe 40 a round slot 28 is provided, which is useful for the connection with the elastic universal clamp 6 over the hole 2'. Then a stop plate 43 is provided with side walls 32 arranged below and the snap-on connection 33.

FIG. 18, with FIG. 18*a*, shows the pre-mounting of the elastic universal clamp 6 with the respective clamp fasteners in the form of the female clamping shoe 13 and the male clamping shoe 40 as a drawing, and FIG. 18*b* shows a drop-off mounting of this innovative solution with an object 10.

FIG. 18 with FIGS. 18*a* and 18*b* demonstrates the mounting of this innovative solution.

FIG. 18*a* shows a pre-mounting of the elastic universal clamp 6, in connection with a drop-off mounting of objects 10 as fishing weights. The male clamping shoe 40 with its tip 31 forward and then lastly the female clamping shoe 13 with the fixing 4 are threaded onto the fishing line 12.

Following this, however, also before the threading of the fishing line 12, the elastic universal clamp 6 can be inserted into the clamp fasteners. For this, Finger 1 and 1' are each pulled onto the respective round slot 28 and 28' over the male clamping shoe 40 and the female clamping shoe 13. The respective holes 2 of the elastic universal clamp 6 are provided for this purpose. The elasticity of the elastic universal clamp 6 is executed in such a manner that the threading into the round slot 28 and 28' can be implemented easily over the holes 2 and the respective lower attachments of the clamp fasteners.

The male clamping shoe 40 and the female clamping shoe 13 are aligned with the side guide 27 for the fishing line 12 and the side guide 41 for the fishing line 12, thus orthogonal to the clamp. A barrel swivel 14 is tied at the end of the fishing line 12 and then inserted into the fixing 4 of the female clamping shoe 13. This provides a pre-mounting of this innovative solution.

As is further illustrated by FIG. 18*a*, a secure, detachable connection is now executable over the respective clamp fasteners, the female clamping shoe 13 and the male clamping shoe 40 over the snap-on connection 29 and the snap-on connection 33.

FIG. 18*b* shows the final mounting of this innovative solution. An object 10, in particular in the form of a stone, is clamped in the drop-off mounting. Fishing line 12 is tightened a little for the time being by the male clamping shoe 40. Then the elastic universal clamp 6 is stretched around object 10 until the snap-on connection 29 of the female clamping shoe 13 and the snap-on connection 33 of the male clamping shoe 40 can be interconnected.

After the connection has engaged, the fishing line 12 in the side guide-outs 27 and 41 is placed around the object 10, specifically a stone. Following this, a hook can be fixed to a second swivel lug of a further fishing line 12. This step can be implemented, depending on choice, before or after the clamping of the object 10.

The complete mounting of the elastic universal clamp 6 for the drop-off mounting of objects 10 as fishing weights is depicted in FIG. 18*b* as a drawing and is again described below.

As previously described, a pre-mounting of the drop-off mounting of objects 10 is necessary, where the male clamping shoe 40 and the female clamping shoe 13 are brought in connection with the elastic universal clamp 6. In further procedure, the fishing line 12 is threaded around the object 10, preferably a stone, and outside of the elastic universal clamp 6. The hose 11 is attached preferentially at the end on the male clamping shoe 40 or on the female clamping shoe 13 over the fixing 4 of the barrel swivel 14. Over the male clamping shoe 40 and the female clamping shoe 13 and their corresponding snap-on connections 29 and 33, a secure, detachable connection of the two clamp fasteners is provided.

In the case of application of this drop-off mounting in pre-mounted state, the functioning method is now described below.

If a tensile force is applied on both sides of the drop-off mounting or both ends of the fishing lines 12, the respective snap-on connection 29 to the snap-on connection 33 detaches and the object 10, in particular a stone, falls from the clamp.

Decisive for this drop-off mounting is that, for detachment of the connection between the two clamping shoes 13 and 40 up to an particularly strong loading force, a pull on both sides is necessary. This effect results from the leverage effect that arises from the side misalignment of the fishing line conduits to the snap-on connections. The connection is designed strong enough to withstand the forces of inertia of the object 10, in particular a stone, when casting. However, if a fish pulls after the bite on the hook, the opposing tensile force and the leverage between the snap-on connection 29 of the female clamping shoe 13 and the snap-on connection 33 of the male clamping shoe 40 neutralize. This static state enables the ejection of the drop-off mounting through the fishing rod. If an especially secure connection of the snap-on connections 29 and 33 is necessary, the snap-on connection 29 and the snap-on connection 33 are rotated by 180°. As a result of the new force loading characteristic and the momenta now at work, a far larger opposing tensile force is necessary to detach the connection. Thus, the drop-off mounting is optimally flexible depending on the purpose of use, location and conditions, and offers a comprehensive solution for different situations.

The advantages and disadvantages of this innovative solution are presented below.

This innovative solution consists of three individual parts that can be optionally combined with a barrel swivel 14 and with a hose 11. These are mounted with each other and then an object 10 is clamped. The individual parts combine to produce a fishing fitting, where the clamped object 10 or the weight detaches after the fish bite through the release of the defined snap-on connection from the snap-on connection 29 of the female clamping shoe 13 and the snap-on connection 33 of the male clamping shoe 40 from the fishing line 12. The central element is the elastic universal clamp 6. Its elasticity makes it possible to clamp a large number of objects 10 of different geometry and weights in the drop-off mounting. Accordingly, the fishing fittings can be changed flexibly and adapted to conditions such as current, wind, fish sighting and cast distance, and factors such as color of the bottom and water turbidity. For example, stones can be simply collected on site as object 10 for bottom fishing.

FIGS. 19, 23, 20, 21 and 25, describe a further design example with application of the elastic universal clamp eU.

Figure 19:
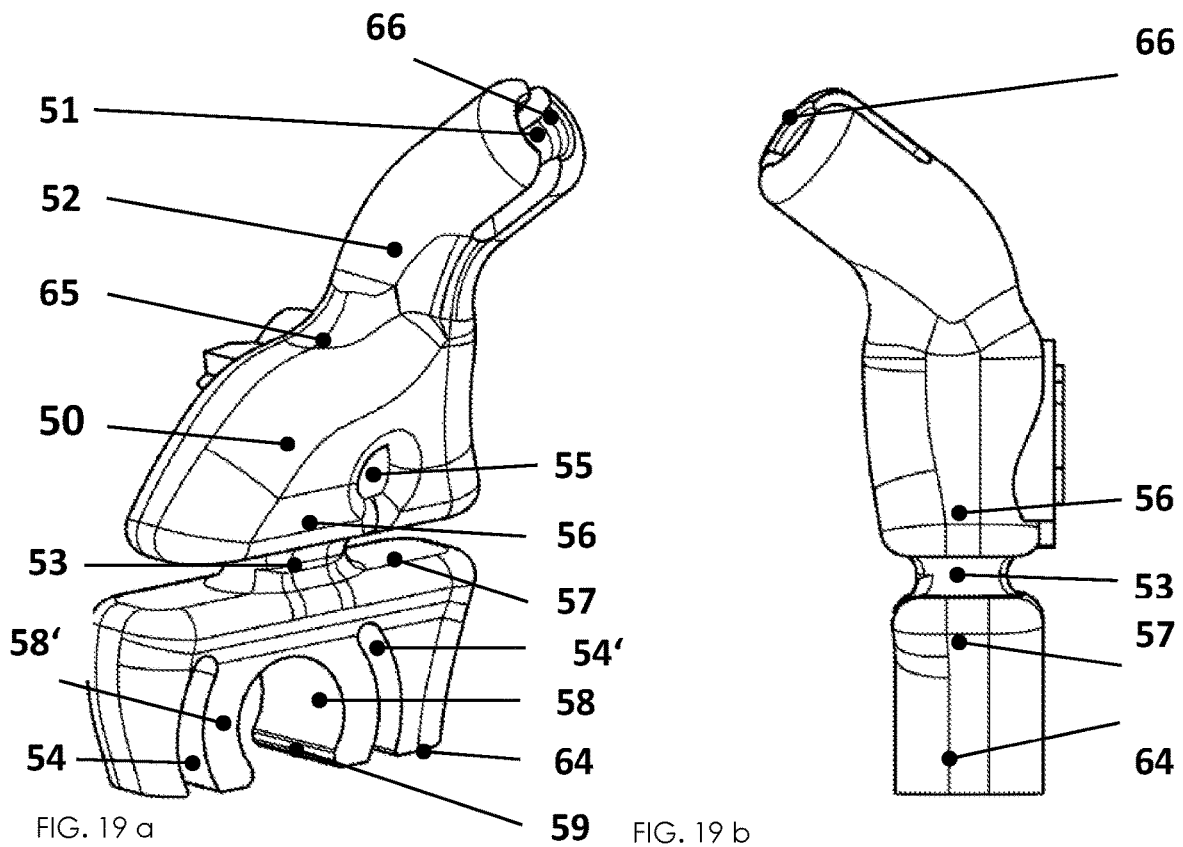
FIG. 19 shows a drop-off.
Figure 19:
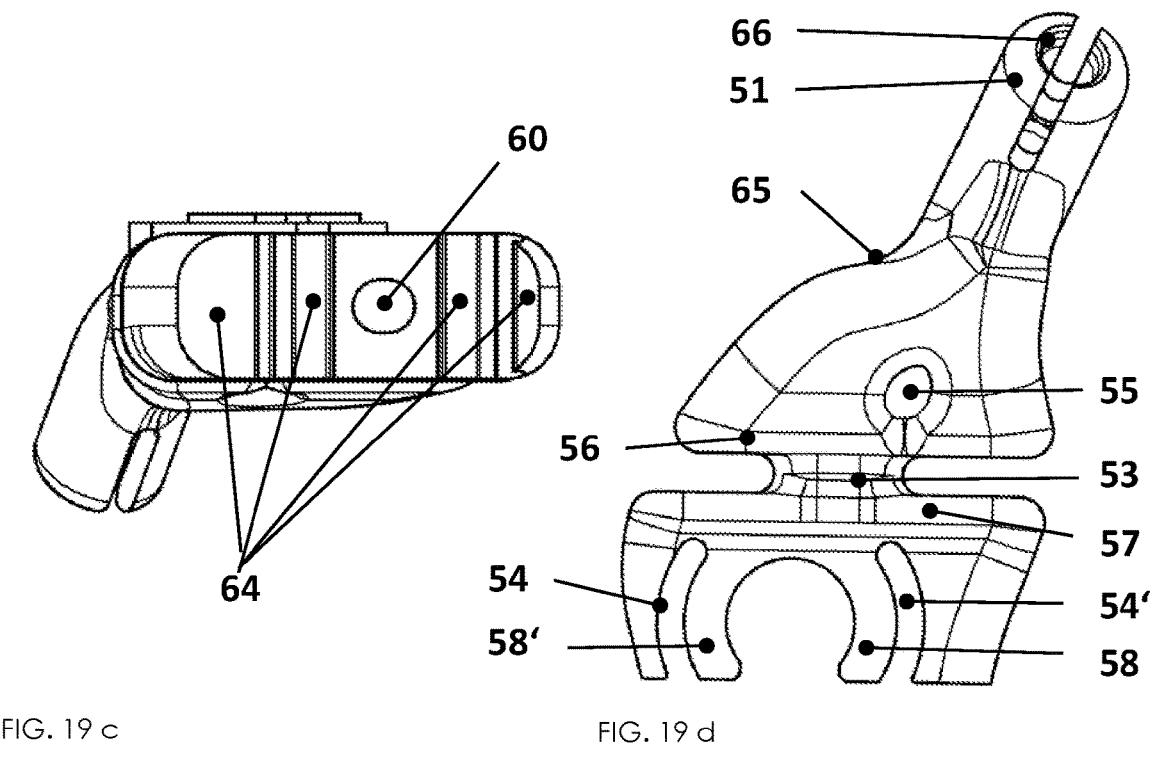

FIG. 19 shows yet another design option of the female clamping shoe 50. This implementation variant is depicted in FIGS. 19*a*, 19*b*, 19*c*, 19*d*, 23*e* and 23*f*. The female clamping shoe 50, with the receptacle component part of the snap-on connection 67, serves in this case as a connecting piece. This involves two snap jaws 58 and 58' which enclose the axially cut off cylindrical form of the male clamping shoe 70 in the form of the snap-on connection 77. The snap jaws 58 and 58' are included in the snap-on connection Part 57 of the female clamping shoe 50. In order to enable their elasticity as a basis for a long-lived snap-on connection, a cut-out 54 and 54' are inserted near both jaws. These cut-outs give the snap-jaws the necessary space for their elastic deformation or their bending up during the snapping procedure. The snap jaws 58 and 58' are implemented at their inner corners 59 and 59' with a special bevel-rounding combination that serves both for the trouble-free mounting of the snap-on connection and for counteracting abrasion and wear to extend durability. When bringing together the female clamping shoe 50 and the male clamping shoe 70, the limit stop surfaces 64 of the female clamping shoe 50 and the limit stop surfaces 76 of the male clamping shoe 70 serve as a limit stop. In order to prevent a slipping of the female and male content of the snap-on connection toward each other, the female snap-on connection 67 is provided with a protection bore 60. When interconnecting both clamping shoes, the locking pin 79 of the male clamping shoe 70 is seated in the protection bore 60. As a result of this, any slipping along the cylinder axis of the snap-on connection 67 is prevented. The protection bore 60 is implemented oval in horizontal direction so that the locking pin represents no obstacle during the side snapping open or detachment or levering up of the snap-on connection clamp. The seating of finger 1 of the elastic universal clamp 6 is implemented with the round slot 53 between the snap-on connection Part 57 and the main body 56 of the female clamping shoe 50. At the upper end of the female clamping shoe 50 is a fixing 51 with a slot form for a standard barrel swivel 14 (FIG. 16*e*). The barrel swivel 14 is inserted into the provided hollow space between the two clamping jaws of the fixing 51 and thus fixed with a non-positive clamp connection. In order to guarantee the problem-free insertion of the swivel 14, the swivel fixing 51 is provided with a bevel at the input. A release 61 is also integrated into the swivel fixing 51 in order to stipulate an exactly defined contact area between the clamping jaws of the swivel fixing 51 and the barrel swivel 14. In addition, a further hollow space 62 is provided for a knot on the barrel swivel 14. With insertion, the two jaws of fixing 51 are bent slightly open, where a press-on force is generated which secures the barrel swivel 14 and accordingly positions the mounting fixed on the fishing line 12. Such a swivel fixing is required for example when fishing with a fixed lead mounting with self-snagging effect. The hollow space 63 for the fishing line 12 within the clamping shoe shaft 52 begins after the knot hollow space 62 and ends with the line conduit outlet 55 to the edge of the main body 56 of the female clamping shoe 50, in accordance with FIG. 23. The implementation of the line conduit and the channel output prevents too severe bending of the fishing line 12 during mounting and guarantees the correct progress of the fishing line 12 with re-clamping the object 10. The clamping shoe shaft 52 is sloped at an angle to the limit stop surfaces 64 and implemented with a bend. This serves, on the one hand, for the line run and, on the other hand, for the leverage effects of the invention in the assembled state. The mounting bowing 65 offers a better seating of the finger for improved operability and a secure hold when applying force in connecting the male and female clamping shoes.

The individual figures show the following representations:

FIG. 19*a* Drop-off—female clamping shoe 50 in a top view
FIG. 19*b* Female clamping shoe 50 in a side view
FIG. 19*c* Female clamping shoe 50 in a lower view
FIG. 19*d* Female clamping shoe 50 in a back view
FIG. 23*e* Female clamping shoe 50 in a front view
FIG. 23*f* Female clamping shoe 50 in a section view to the side.

The principal features of the female clamping shoe 50 are characterized in that a fixing 51 is located above the clamping shoe which is used for the fixing of the barrel swivel 14. A fishing line is integrated into the hollow space 63 (see FIG. 23*f*).

Furthermore, an outlet of the fishing line occurs over the hollow space 63 in the line conduit outlet. Then, on the main body of the clamping shoe 50 below, a round slot 53 is provided for the fastening of the elastic universal clamp 6. On this is located the snap-on connection Part 57 of the clamping shoe with the respective snap jaws 58 and snap jaws 58' of the female snap-on connection 67.

FIG. 23*f* shows a section view E-E from out of FIG. 5*e*. A hollow space 63 is provided in this case for a fishing line in the clamping shoe shaft 52, where the fixing 51, the contact release 61, the knot hollow space 62 and the line conduit outlet 55 for the fishing line 12 are visible.

FIG. 20, with its subordinate FIGS. 20*a*, 20*b*, 20*c*, 20*d*, 24*e* and 24*f*, shows the male clamping shoe 70 of the drop-off mounting. This also includes a hollow space 81 within a shaft 71 for the fishing line 12 and a line conduit outlet 72 for the fishing line 12. The male clamping shoe shaft 71 is also sloped at an angle to the limit stop surfaces 76 and implemented with a bend. The geometric arrangement of both clamping shoe shafts with respect to each other forms a basic prerequisite for the drop-off effect of the invention through the occurring leverage with tension on both sides of the fishing line. Furthermore, a stop plate 75 of the male clamping shoe 70 is provided, where the snap-on connection 77 is located opposite the female clamping shoe 50. The taper 78 of the male snap-on connection 77 forms an important geometrical characteristic for the cupping engagement of the snap jaws 58 and 58' of the female snap-on connection 67. The male snap-on connection 77 is provided with a locking pin 79 against slippage of the snap-on connection. Furthermore, the locking pin 79 and the corresponding bore in the female snap-on connection 67 serve as centering for ensuring that the complete length of the cylinder surface of the snap-on connection 77 of the male clamping shoe 70 is cupped by the snap-jaws of the female clamping shoe 50. This guarantees constant release force of the snap-on connection. A further characteristic of the male clamping shoe 70 is the implementation of the tapered line conduit opening 82. This enables the mounting of a hose 11, which opposes the twist rotation of the fishing line 12 around the mounting when casting or dropping in the water. The hose 11 can be optionally pushed into the line conduit opening 82 of the male clamping shoe 70 to prevent twisting. A mounting bowing 80 is also provided on the male clamping shoe 70. This offers better seating of the finger for improved operability and a secure hold when applying force in connecting the male and female clamping shoes.

The male clamping shoe 70 is depicted in the individual figures, where FIG. 20*a* gives a general view of the male clamping shoe 70 and FIG. 20*b* indicates a side view of the male clamping shoe 70. FIG. 20*c* shows a lower view of the male clamping shoe 70 and FIG. 20*d* a back view of the male clamping shoe 70. FIG. 24*e* includes a front view of the male clamping shoe 70 and FIG. 24*f* a derived section view D-D of the male clamping shoe.

The male clamping shoe 70 is structured so that a tapered line conduit opening 82 with included hollow space 81 is implemented on the upper end of the shaft 71 of the male clamping shoe 70, up to the line conduit outlet 72 of the fishing line 12. Below the main body 73 of the male clamping shoe 70 is provided a round slot 74, which is used for the connection with the elastic universal clamp 6 over the hole 2. Then a stop plate 75 is provided with a snap-on connection 77 arranged below.

FIG. 21, with FIGS. 21a and 21b, shows the pre-mounting of the elastic universal clamp eU with the respective clamp fasteners in the form of the female clamping shoe 50 and the male clamping shoe 70 as a drawing and, with FIGS. 25c and 25d, a drop-off mounting of this innovative solution with an object 10.

The mounting of this innovative solution is depicted in FIG. 21 with the FIGS. 21a, 21b, to 25c and 25d.

FIGS. 21a and 21b show a pre-mounting of the elastic universal clamp eU in connection with a drop-off mounting of objects 10 as fishing weights. For this purpose, the male clamping shoe 70, with the line conduit opening 82, is threaded forward through the line conduit outlet 72 and then the female clamping shoe 50, with the line conduit outlet 55 and lastly the swivel fixing 51, is threaded on the fishing line 12. The elastic universal clamp 6 can then be inserted into the clamp fasteners, yet also before the threading of the fishing line 12. For this purpose, fingers 1 and 1' each are moved over the male clamping shoe 70 and the female clamping shoe 50 onto the respective round slots 74 and 53. The respective holes 2 of the elastic universal clamp 6 are provided for this purpose. The elasticity and size of the holes 2 of the elastic universal clamp 6 are such that threading into the round slot 74 and 53 can be implemented easily over the holes 2 and the respective lower attachments of the clamp fasteners.

In the process, the male clamping shoe 70 and the female clamping shoe 50 are aligned with the line conduit opening 82 and the swivel fixing 51, and orthogonal to the clamp 6. A barrel swivel 14 is tied to the end of the fishing line 12 and then inserted into the fixing 51 of the female clamping shoe 50. This provides pre-mounting of this innovative solution.

As is further illustrated by FIGS. 21a and 21b, a secure, detachable connection is executable over the respective clamp fasteners, the female clamping shoe 50 and the male clamping shoe 70 over the snap-on connection 67 and the snap-on connection 77.

FIGS. 25c and 25d show the final mounting of this innovative solution. In this case an object 10, in particular in the form of a stone, is clamped in the drop-off mounting. Fishing line 12 is provisionally pulled a little by the male clamping shoe 70. Then the elastic universal clamp 6 is stretched around object 10, until the snap-on connection 67 of the female clamping shoe 50 and the snap-on connection 77 of the male clamping shoe 70 can be interconnected.

The attachments of the fingers of the universal clamp 1 and 1' are moved near the clamping shoes in order to generate sufficient extension of the holes 3 and to enclose the object 10 securely on the side.

After the snap-on connections 67 and 77 have engaged, the limit stop surfaces 64 and 76 come in contact. The fishing line 12 is placed around object 10, in particular a stone. Subsequently a further fishing line 90 can be fixed on a second swivel lug with a hook. This step can be implemented, depending on choice, before or after the clamping of the object 10.

The complete mounting of the elastic universal clamp 6 for the drop-off mounting of objects 10 as fishing weights is depicted in FIGS. 21 and 25 as a drawing and is again described below.

As previously described, a pre-mounting of the drop-off mountings of objects 10 is necessary, where the male clamping shoe 70 and the female clamping shoe 50 are brought in connection with the elastic universal clamp 6. In further procedure, the fishing line 12 is placed around the object 10, preferably a stone, outside of the elastic universal clamp 6. At the end, the hose 11 can be advantageously attached in the line conduit opening 82 of the male clamping shoe 70 or on the female clamping shoe 50 over the fixing 51 of the barrel swivel 14. Over the male clamping shoe 70 and the female clamping shoe 50 and their corresponding snap-on connections 77 and 67, a secure, detachable connection of the two clamp fasteners is now provided.

In case of application of this drop-off mounting in the pre-mounted state, the functioning method is now described below.

If a tensile force is applied on both sides of the drop-off mounting or both ends of the fishing lines 12 and 90, the respective snap-on connection 77 to the snap-on connection 67 detaches and the object 10, in particular a stone, falls from the clamp.

Crucial to this drop-off mounting is that, for the detachment of the connection of the two clamping shoes 50 and 70 up to an especially strong loading force, a pull on both sides is necessary. This effect results from the leverage that arises from the side misalignment of the ends of the line conduit shafts 52 and 71 to the snap-on connections 67 and 77. The connection is designed strong enough to withstand the force of inertia of the object 10, in particular a stone, when casting with the fishing rod. If a fish pulls on the hook after the bite and the angler simultaneously pulls on the fishing rod then, due to the opposing tensile force and the leverage between the snap-on connection 67 of the female clamping shoe 50 and the snap-on connection 77 of the male clamping shoe 70, the secure, detachable connection is forced open. The force progression and momenta now at work enable the casting of the drop-off mounting with the fishing rod.

The advantages and disadvantages of this innovative solution are presented below.

This innovative solution consists of three individual parts that can be optionally combined with a barrel swivel 14 and with a hose 11. These are mounted with each other and then an object 10 is clamped. The individual parts combine to produce a fishing fitting, where the clamped object 10 or the weight detaches after the bite of the fish through the release of the defined snap-on connection from the snap-on connection 67 of the female clamping shoe 50 and the snap-on connection 77 of the male clamping shoe 70 of the fishing line 12. The central element is the elastic universal clamp 6. As a result of its elasticity, many objects 10 of different geometry and weights can be clamped in the drop-off mounting. Accordingly, the fishing fittings can be changed flexibly and adapted to conditions such as current, wind, fish sighting and cast distance, and factors such as color of the bottom and water turbidity. For example, stones can simply be collected on site as objects 10 for bottom fishing.

The invention, compared to the current state of the art, offers the possibility of considerably improving the ecological sustainability of fishing, while the functional further development and optimization also offer advantages.

In summary, the drop-off mounting of this innovative solution is novel, flexible, ecologically sustainable, financially profitable, improves catch success rates and is fun to use.

REFERENCE SIGNS

1 Finger
2 Hole
3 Hole pattern
4 Fixing
4f Fixing
5 Tongue
6 Elastic universal clamp 9 Hollow space
10 Object
11 Hose
12 Fishing line
13 Female clamping shoe
14 Barrel swivel
15 Snap jaws
15' Snap jaws
26 Stop plate
27 Side guide
28 Round slot
28' Round slot
29 Snap-on connection
31 Tip
32 Side wall
32' Side wall
33 Snap-on connection
40 Male clamping shoe
41 Side fishing line guide
42 Hollow space
43 Stop plate
60 Fixing hook
110 Fishing line conduit
130 Fishing line
140 Head
150 Narrow head support
160 Cover plate
170 Wire conduit
180 Integrated guide
190 Deepening
200 Conduit
210 Lug
220 Tip
230 Underside
240 Fastening rod
250 Tongue
260 Barrel swivel
270 Knot-free connector
280 Tube formation
290 Wire
300 Swivel
301 Central hole
310 Feed basket
320 Hose
340 Pose
400 Anchor body
401 Hole pattern
410 Anchor head
420 Fix
440 Fishing line conduit
450 Hollow space
460 Cut-out
470 Taper
480 Underside
490 Anchor head support
500 Anchor head
501 Bead
600 Stabilization plate
700 Taper
800 Narrow anchor head support
900 Hollow space
2000 Clamping lug
eU elastic universal clamp
IA Inline anchor
TA Drop anchor
IA2 Inline anchor

The invention claimed is:

1. An apparatus for mounting weights to a fishing line, comprising:
   an elastic clamp having a central portion and two fingers extending outwardly on opposite ends from the central portion; and
   an inline anchor which is connected to the fishing line, the inline anchor having
      an anchor body having a length extending along a longitudinal axis, and
      a fishing line conduit extending longitudinally through the length of the anchor body,
   wherein an object having a weight can be attached to the fishing line by wrapping the elastic clamp around the object and removably attaching the two fingers to one another by connecting each finger to the inline anchor.

2. The apparatus as in claim 1, further comprising:
   an anchor head; and
   an anchor head support arranged between the anchor head and the anchor body, the anchor head support being narrower than the anchor head.

3. The apparatus as in claim 2,
   wherein the anchor head is tapered, and
   wherein each of the two fingers includes a hole, and
   wherein the fingers are connected to the inline anchor by moving their respective holes over the anchor head until they are seated in the anchor head support.

4. The apparatus as in claim 1,
   wherein an underside of the inline anchor facing the object has a curved shape.

5. The apparatus as in claim 1,
   wherein the fishing line conduit is tapered.

6. The apparatus as in claim 1,
   further comprising a swivel fixing adapted for receiving a barrel swivel arranged at one end of the fishing line conduit.

7. The apparatus as in claim 6,
   wherein the swivel fixing comprises two jaws which can bend open and generate a clamping force to secure the barrel swivel in place.

* * * * *